(12) United States Patent
Rimoto et al.

(10) Patent No.: US 6,503,144 B1
(45) Date of Patent: Jan. 7, 2003

(54) COMPUTER READABLE PROGRAM PRODUCT STORING PROGRAM FOR BALL-PLAYING TYPE GAME, SAID PROGRAM, AND BALL-PLAYING TYPE GAME PROCESSING APPARATUS AND METHOD

(75) Inventors: Shiyu Rimoto, Tokyo (JP); Tomoaki Yoshinobu, Hyogo (JP)

(73) Assignee: Square Co., Ltd., Tokyo (JP)

( * ) Notice: Subject to any disclaimer, the term of this patent is extended or adjusted under 35 U.S.C. 154(b) by 14 days.

(21) Appl. No.: 09/629,630

(22) Filed: Jul. 31, 2000

(30) Foreign Application Priority Data

Jan. 28, 2000 (JP) .......................... 2000-020992
May 12, 2000 (JP) .......................... 2000-140850

(51) Int. Cl.7 ............................... A63B 13/00
(52) U.S. Cl. ............................ 463/4; 463/30; 463/31; 463/32; 434/307 R; 273/148 B; 273/460; 273/467; 273/459; 345/473; 345/474; 345/475; 345/418; 345/419; 345/428; 345/156; 345/441
(58) Field of Search .................. 463/4, 1, 31; 345/473, 345/427, 474, 121, 126, 156, 161, 162, 163, 167, 418, 475; 273/437, 88, 93; 364/410

(56) References Cited

U.S. PATENT DOCUMENTS 4,672,541 A * 6/1987 Bromley et al. ............... 463/3
5,767,861 A * 6/1998 Kimura ....................... 345/473
5,779,548 A * 7/1998 Asai et al. .................... 463/31
6,203,425 B1 * 3/2001 Hayashi ........................ 463/1

FOREIGN PATENT DOCUMENTS

EP 0916376 5/1999
JP 8-305891 11/1996
WO 98/43715 10/1998

OTHER PUBLICATIONS

English Language Abstract of JP 8–305891.

* cited by examiner

Primary Examiner—Jessica Harrison
Assistant Examiner—Y Cherubin
(74) Attorney, Agent, or Firm—Greenblum & Bernstein, P.L.C.

(57) ABSTRACT

A computer readable program product stores a program of a ball-playing type game which can smoothly express the continuous action of a player before and after a player obtains a ball when throwing the ball in any direction in accordance with operation of the user in the ball-playing game. An input operation of the user is accepted before the fielder receives the ball, a series of motions up to the fielder catching the ball and throwing it is judged in response to any input operation, and the motion is used to change the display up until the catching and throwing before the fielder catches the ball.

36 Claims, 16 Drawing Sheets

Fig.5

| DIRECTION | GROUP OF MOTIONS | NUMBER OF FRAMES | AMOUNT OF MOVEMENT PER FRAME | CATCHING RANGE | HEIGHT OF GLOVE WHEN CATCHING | RANGE OF CATCHABLE HEIGHT |
|---|---|---|---|---|---|---|
| A | #11 | 20 | 0.30 m | L1~L2 | H1 | 0~h1 |
|   | #12 | 20 | 0.30 m | L1~L2 | H2 | h1~h2 |
|   | #13 | 20 | 0.30 m | L1~L2 | H3 | h2~h3 |
|   | #14 | 20 | 0.30 m | L1~L2 | H4 | h3~h4 |
|   | #15 | 10 | 0.30 m | L1 OR LESS | H1 | 0~h1 |
|   | ... | ... | ... | ... | ... | ... |
| B | #21 | 20 | 0.20 m | L3~L4 | H1 | 0~h1 |
|   | #22 | 20 | 0.20 m | L3~L4 | H2 | h1~h2 |
|   | #23 | 20 | 0.20 m | L3~L4 | H3 | h2~h3 |
|   | #24 | 10 | 0.20 m | L3 OR LESS | H1 | 0~h1 |
|   | ... | ... | ... | ... | ... | ... |
| C | #31 | 20 | 0.15 m | L5~L6 | H1 | 0~h1 |
|   | #32 | 20 | 0.15 m | L5~L6 | H2 | h1~h2 |
|   | #33 | 20 | 0.15 m | L5~L6 | H3 | h2~h3 |
|   | #34 | 10 | 0.15 m | L5 OR LESS | H1 | 0~h1 |
|   | ... | ... | ... | ... | ... | ... |
| D | #41 | 20 | 0.20 m | L3~L4 | H1 | 0~h1 |
|   | #42 | 20 | 0.20 m | L3~L4 | H2 | h1~h2 |
|   | #43 | 20 | 0.20 m | L3~L4 | H3 | h2~h3 |
|   | #44 | 10 | 0.20 m | L3 OR LESS | H1 | 0~h1 |
|   | ... | ... | ... | ... | ... | ... |
|   | #M | 10 | 0.20 m | L3 OR LESS | H4 | h3~h4 |

Fig. 6

| DIRECTION | GROUP OF MOTIONS | THROWING DIRECTION | THROWABLE DISTANCE |
|---|---|---|---|
| A | # 11 | FORWARD | D1~D2 |
|   | # 12 | RIGHT | D1~D2 |
|   | # 13 | LEFT | D1~D2 |
|   | # 14 | BACK | D1~D2 |
|   | # 15 | FORWARD | 0~D1 |
|   | ⋮ | ⋮ | ⋮ |
| B | # 21 | FORWARD | D1~D2 |
|   | # 22 | RIGHT | D1~D2 |
|   | # 23 | LEFT | D1~D2 |
|   | # 24 | BACK | D1~D2 |
|   | ⋮ | ⋮ | ⋮ |
| C | # 31 | FORWARD | D1~D2 |
|   | # 32 | RIGHT | D1~D2 |
|   | # 33 | LEFT | D1~D2 |
|   | # 34 | BACK | D1~D2 |
|   | ⋮ | ⋮ | ⋮ |
| D | # 41 | FORWARD | D1~D2 |
|   | # 42 | RIGHT | D1~D2 |
|   | # 43 | LEFT | D1~D2 |
|   | # 44 | BACK | D1~D2 |
|   | ⋮ | ⋮ | ⋮ |
|   | # M | BACK | 0~D1 |

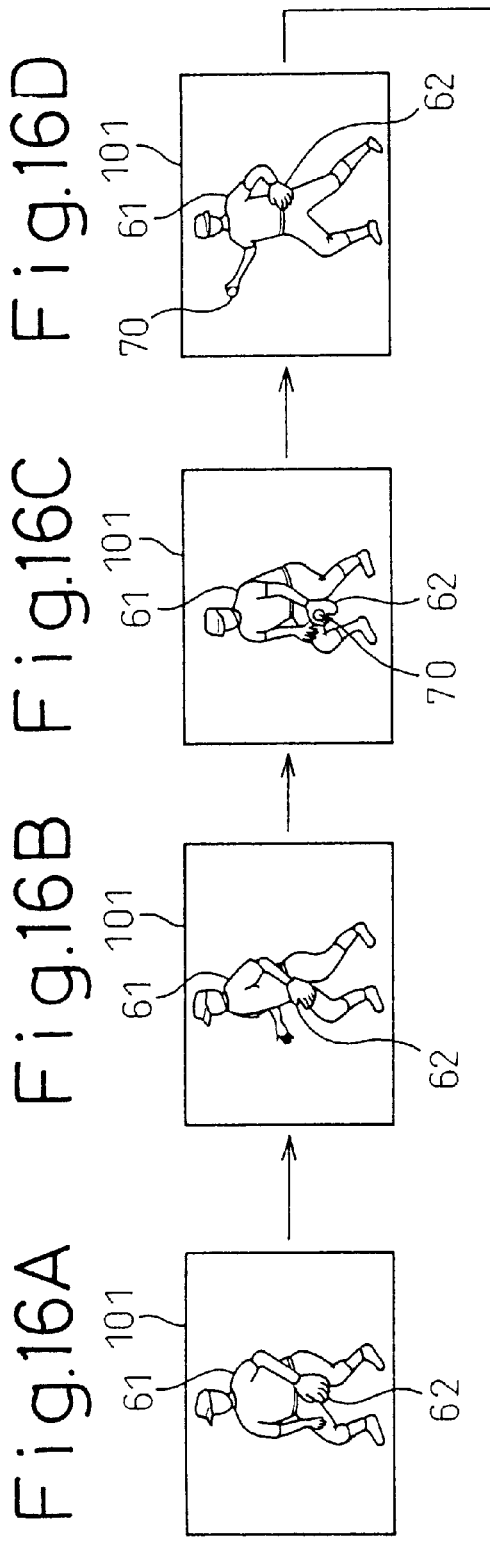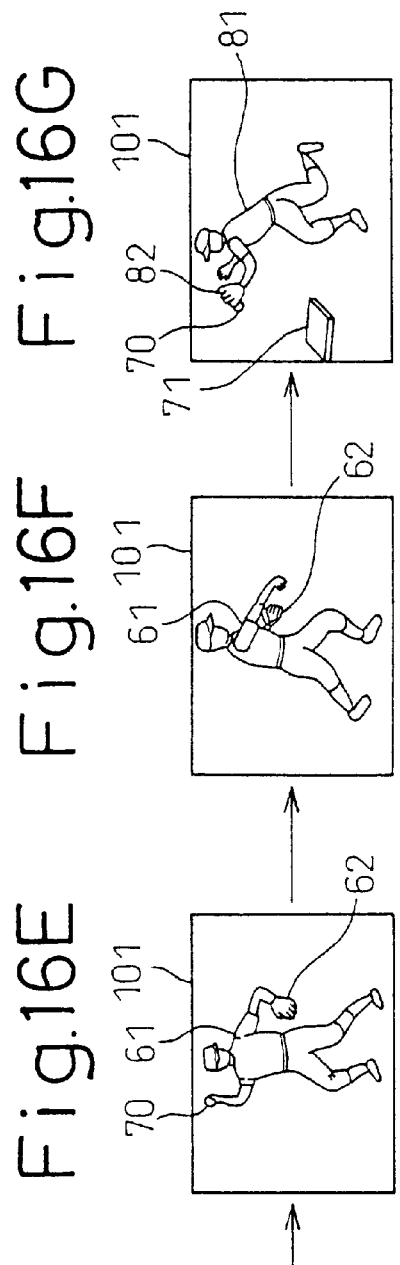

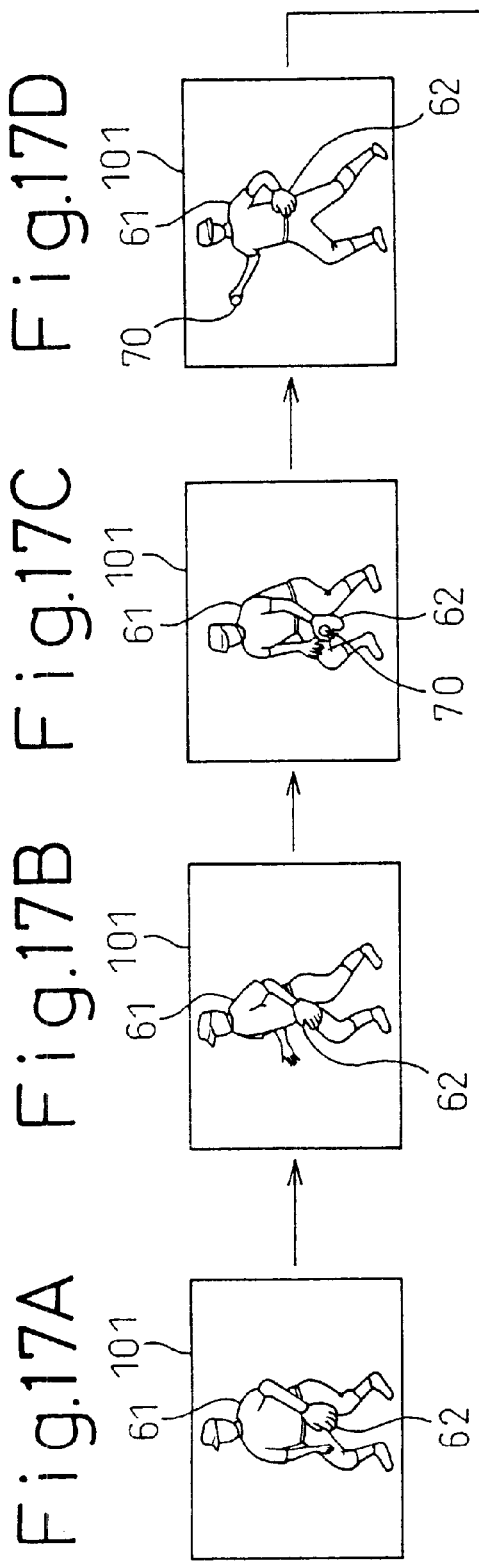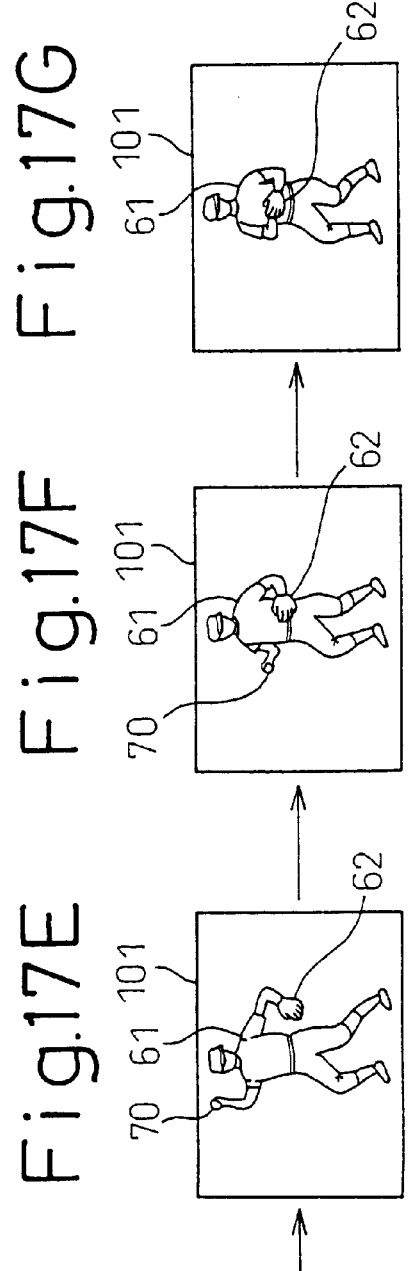

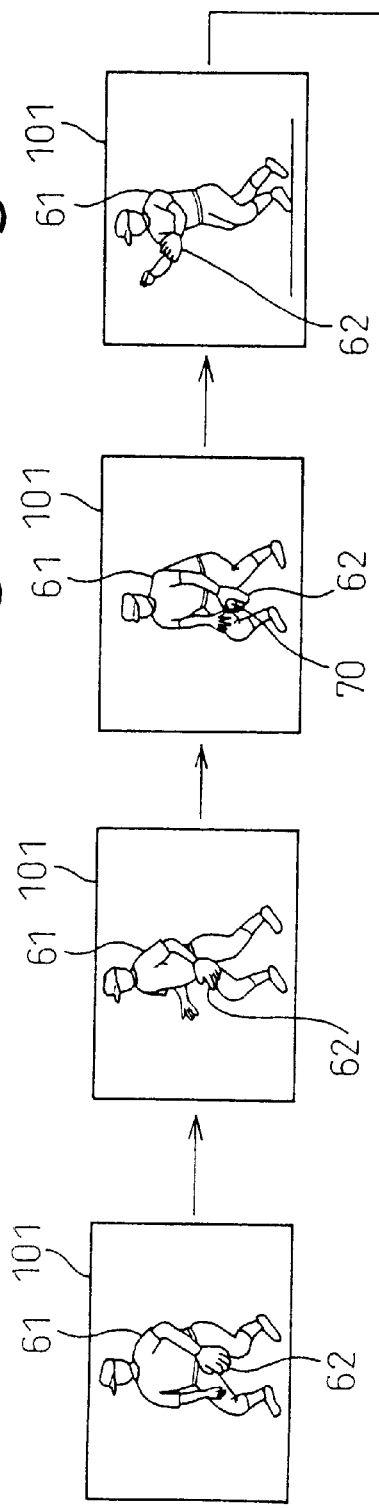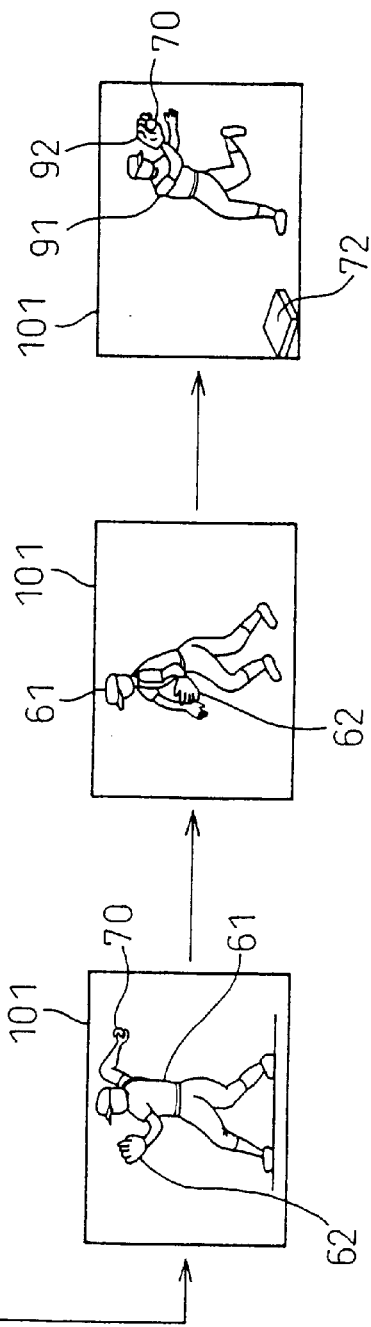

COMPUTER READABLE PROGRAM PRODUCT STORING PROGRAM FOR BALL-PLAYING TYPE GAME, SAID PROGRAM, AND BALL-PLAYING TYPE GAME PROCESSING APPARATUS AND METHOD

The present disclosure relates to subject matter contained in Japanese Patent Application No. 2000-140850, filed on May 12, 2000, the disclosure of which is expressly incorporated herein by reference in its entirety.

BACKGROUND OF THE INVENTION

1. Field of the Invention

The present invention relates to a computer readable program product storing a program of a ball-playing type game controlling motions of a player in the ball-playing type game, such a program, and a ball-playing type game processor and method.

2. Description of the Related Art

In a baseball game of the related art, generally a collision judgement area of a predetermined magnitude is set around each fielder. When the ball enters this collision judgement area, the catching action of the fielder is started and the image of the catching action is displayed on the screen.

As this type of related art, there is for example Japanese Unexamined Patent Publication (Kokai) No. 8-305891. According to this publication, calculations are made to predict the projected dropping point of the ball from the speed of the ball and the direction of flight. A collision area is virtually set at this projected dropping point. When the fielder enters this set collision area, a catching pose corresponding to the position of the fielder is displayed.

Summarizing the problems to be solved by the invention, when using a collision area to judge a collision between a fielder and area as in the above publication, it was necessary to realize the catching motion within a constant time after the collision, no matter what the pose or state of movement of the fielder. In this case, sufficient time could not be obtained from the catching pose to the catching action of the fielder. The motion had to be completed in a predetermined time, that is, in a predetermined number of frames.

As technology resembling the above publication, there is for example International Publication No. WO98/43715. This publication discloses the technology of finding the distance between the ball and fielder at the time when the fielder (catcher) approaches the ball (moving object) and judging that the fielder has reached the ball when the distance is within a predetermined range.

As shown in the above International Publication No. WO98/43715, the action of the fielder can be realized smoothly in accordance with progress in image processing. In this case as well, if determining the throwing action after the catching action is completed, it is difficult to obtain smooth continuity of the action from before to after the catching action.

Therefore, with just smoothly expressing the action of the fielder, the smoother the action, the more the discontinuously expressed portions stand out in continuous actions. Accordingly, the balance in expression becomes poor and conversely a strange feeling is given to the user.

A baseball game was explained in detail above, but the requirement for smooth continuity in the action of a player with respect to the ball applies to all ball-playing games handling balls due to the relationship between the instructions for action of the player by the user and the continuous actions of the player displayed. Other examples of ball-playing games include soccer, basketball, tennis, American football, and ice hockey.

SUMMARY OF THE INVENTION

An object of the present invention is to provide a computer readable program product storing a program of a ball-playing type game which enables reproduction of realistic, smooth motion between a player and a ball in the ball-playing game, such a program, and a ball-playing type game processor and method.

According to a first aspect of the present invention, there is provided a computer readable program product storing a program for a ball-playing type game which realizes a ball-playing game indirectly controlling movement of a ball in accordance with movement of a player. The program product stores a program for making a computer judge a future range of player movement and a future range of ball movement. The computer also calculates a position of the ball after the elapse of a display time of each group of motions assigned to the player in accordance with the judged future range of ball movement. Each player is assigned multiple groups of motions relating to manipulating the ball. Each group of motions is assigned a required display time. The computer also calculates a time required to reach the calculated ball position in accordance with the judged future range of player movement. In addition, the computer selects a group of motions having a required time that is greater than the calculated required time from among the groups of motions assigned to the player. Finally, the computer displays movement of the player employing the selected group of motions.

In one aspect, the player includes multiple players and the judging further includes making the computer judge a future range of movement for each of the players. The calculating further includes making the computer calculate a time for each of the players. The finding may further include finding in response to the game progress state.

After calculating, the computer can judge a throw destination of the ball in response to a user operation. In this case, the selected group of motions is a group of motions for throwing the ball to the judged throw destination.

In one embodiment, the program further makes the computer judge the throw destination of the ball in response to a user when displaying the movement of the player. The computer also finds the group of motions for throwing the ball to the judged throw destination from among the groups of motions assigned to the player in response to the state of progress of the game. Finally, the computer displays the movement of the player using the found group of motions and the group of motions already being used.

In another embodiment, the program further makes the computer combine motions using the found group of motions and the group of motions already being used. The computer may also connect motions using the found group of motions and the group of motions already being used.

In another embodiment, a program is provided for a ball-playing type game which realizes a ball-playing game indirectly controlling movement of a ball in accordance with movement of a player using a computer. The program makes a computer judge a future range of player movement and a future range of ball movement. The computer also calculates a position of the ball after the elapse of a display time of each group of motions assigned to the player in accordance with the judged future range of ball movement. Each player is assigned multiple groups of motions relating to manipulating the ball. Each group of motions is assigned a required display time. The computer also calculates a time required to reach the calculated ball position in accordance with the judged future range of player movement. In addition, the computer selects a group of motions having a required time that is greater than the calculated required time from among the groups of motions assigned to the player. Finally, the computer displays movement of the player employing the selected group of motions.

In another aspect, a ball-playing type game processor includes a computer readable program product storing a program for a ball-playing type game which realizes a ball-playing game indirectly controlling movement of a ball in accordance with movement of a player. The processor also includes a computer for reading and executing at least part of the program from the program product, and a display for displaying the ball-playing game realized by the program. The computer reads at least part of the program from the program product and thereby judges a future range of player movement and a future range of ball movement. The computer also calculates a position of the ball after the elapse of a display time of each group of motions assigned to the player in accordance with the judged future range of ball movement. Each player is assigned multiple groups of motions relating to manipulating the ball, each group of motions being assigned a required display time. The computer also calculates a time required to reach the calculated ball position in accordance with the judged future range of player movement, and selects a group of motions having a required time that is greater than the calculated required time from among the groups of motions assigned to the player. Finally, the computer displays movement of the player employing the selected group of motions.

According to another aspect of the present invention, a ball-playing type game processing method is provided for realizing a ball-playing game indirectly controlling movement of a ball in accordance with movement of a player using a computer. The method includes judging a future range of player movement and a future range of ball movement. The method also includes calculating a position of the ball after the elapse of a display time of each group of motions assigned to the player in accordance with the judged future range of ball movement. Each player is assigned multiple groups of motions relating to manipulating the ball, each group of motions being assigned a required display time. The method further includes calculating a time required to reach the calculated ball position in accordance with the judged future range of player movement. In addition, the method includes selecting a group of motions having a required time that is greater than the calculated required time from among the groups of motions assigned to the player; and displaying movement of the player employing the selected group of motions.

Preferably, each of the above aspects also includes judging the throw destination of the ball in response to an operation by the user when displaying the movement of the particular player, and finding the group of motions for throwing the ball to the judged throw destination from among the groups of motions assigned to the player in response to the state of progress of the game. Each aspect also includes displaying the movement of the player using the found group of motions and the group of motions already being used.

Preferably, each of the above aspects further includes judging the throw destination of the ball in response to an operation by the user when displaying the movement of the player, and finding the group of motions for throwing the ball to the judged throw destination from among the groups of motions assigned to the player in consideration with the state of progress of the game. Each aspect also includes displaying the movement of the player using the found group of motions and the group of motions already being used.

More preferably, each of the above aspects also includes combining or connecting motions using the found group of motions and the group of motions already being used.

BRIEF DESCRIPTION OF THE DRAWINGS

These and other objects and features of the present invention will become clearer from the following description of the preferred embodiments given with reference to the attached drawings, in which:

FIG. 5 is a view explaining a data table involved in catching in an embodiment of the present invention;

FIG. 6 is a view explaining a data table involved in throwing in an embodiment of the present invention;

FIG. 10A is a view explaining a method of prediction of a player able to catch a ball according to an embodiment of the present invention, while

FIG. 11A is a view explaining a method of correction of motion when viewing a player from above according to an embodiment of the present invention, while

FIG. 13A is a view schematically explaining a series of catching actions in frame units according to an embodiment of the present invention, while FIG. 13B is a view schematically explaining a method of correction of a catching position corresponding to the frame of FIG. 13A;

FIG. 16A is a view of an example of an image display of a waiting state for catching according to an embodiment of the present invention, FIG. 16B is a view of an example of an image display immediately after the start of a catching action according to an embodiment of the present invention, FIG. 16C is a view of an example of an image display at the time of catching according to an embodiment of the present invention, FIG. 16D is a view of an example of an image display after catching according to an embodiment of the present invention, FIG. 16E is a view of an example of an image display of a throwing pose according to an embodiment of the present invention, FIG. 16F is a view of an example of an image display after throwing by connected motions according to an embodiment of the present invention, and FIG. 16G is a view of an example of a scene where another fielder receives a thrown ball according to an embodiment of the present invention;

FIG. 17A is a view of an example of an image display of a waiting state for catching according to an embodiment of the present invention, FIG. 17B is a view of an example of an image display immediately after the start of a catching action according to an embodiment of the present invention, FIG. 17C is a view of an example of an image display at the time of catching according to an embodiment of the present invention, FIG. 17D is a view of an example of an image display after catching according to an embodiment of the present invention, FIG. 17E is a view of an example of an image display of a throwing pose according to an embodiment of the present invention, FIG. 17F is a view of an example of an image display of a scene shifting from a throwing pose to a waiting state according to an embodiment of the present invention, and FIG. 17G is a view of an example of an image display of a waiting state according to an embodiment of the present invention; and FIG. 18A is a view of an example of an image display of a waiting state for catching according to an embodiment of the present invention, FIG. 18B is a view of an example of an image display immediately after the start of a catching action according to an embodiment of the present invention, FIG. 18C is a view of an example of an image display at the time of catching according to an embodiment of the present invention, FIG. 18D is a view of an example of an image display immediately after starting to combine motions according to an embodiment of the present invention, FIG. 18E is a view of an example of an image display of a scene of throwing a ball by combining motions according to an embodiment of the present invention, FIG. 18F is a view of an example of an image display after throwing by combining motions according to an embodiment of the present invention, and FIG. 18G is a view of an example of a scene where another fielder receives a thrown ball according to an embodiment of the present invention.

DESCRIPTION OF THE PREFERRED EMBODIMENTS

Preferred embodiments of the present invention will be explained below with reference to the drawings. In the following explanation, a baseball game is used as an example among the various ball-playing type games.

Figure 1:
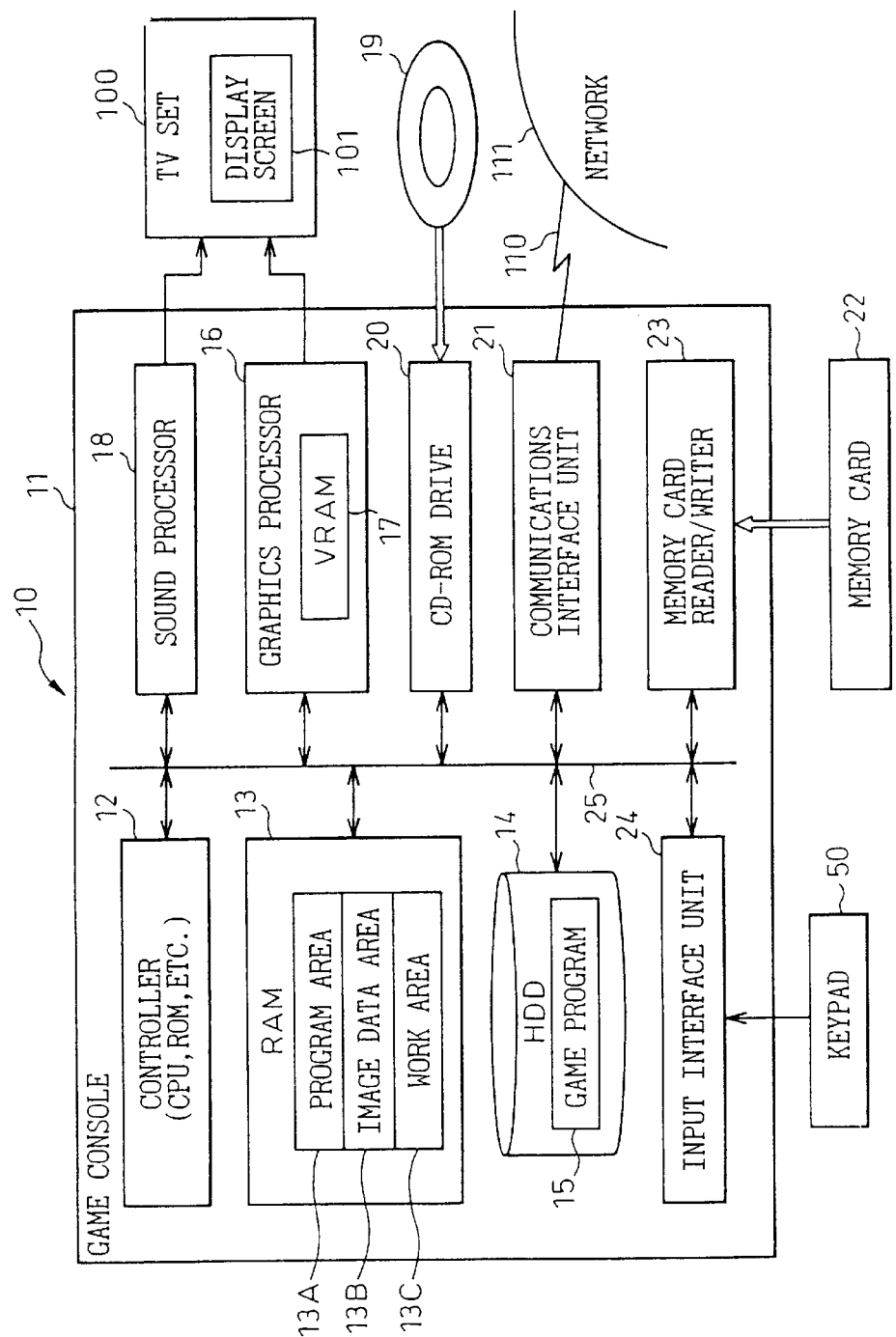
FIG. 1 is a block diagram of an example of the hardware configuration of an embodiment of the present invention.

First, an explanation will be made of the configuration using FIG. 1. FIG. 1 shows an example of the configuration of a video game system according to an embodiment of the present invention. The video game system 10 shown in FIG. 1 is provided with the functions of a ball-playing type game processor according to an embodiment of the present invention. Further, the video game system 10 executes a program stored on a computer readable program product according to an embodiment of the present invention. Further, the video game system 10 is used for working the ball-playing type game processing method according to an embodiment of the present invention.

The video game system 10 includes, for example, a game console 11 for processing a video game in accordance with a program, a keypad 50 for interactively controlling the video game, and a television set (hereinafter called a "TV set") having a cathode ray tube (CRT) etc. as a monitor with speakers. Further, this video game system 10 is provided with a communications interface unit 21 and is connected to a network 111 by a communications line 110 for data communications with another network apparatus.

The keypad 50 has multiple buttons or a joystick able to be operated by the user (operator). Instructions due to the button operation or joystick operation of the user are given to the game console 11. Here, the buttons or joystick have the functions of inputting a pitching operation of the pitcher, a swinging operation of the batter, a stealing operation of a runner, and a catching/throwing operation of a fielder in the operation of a baseball game explained later. The TV set 100 displays a video (image) or outputs sound in accordance with the content of the game based on a video signal and sound signal output from the game console 11.

The game console 11 has an internal bus 25. The internal bus 25 has connected to it a controller provided with a central processing unit (CPU), read only memory (ROM), and other units, a random access memory (RAM) 13, and a hard disk drive (HDD) 14.

The controller 12 controls the hardware as a whole and stores all or part of the program in the RAM 13 for execution of the game processing.

The RAM 13 is provided with a program area 13A, an image data area 13B, a work area 13C, etc. The program area 13A stores the program of the game. The program area 13A stores all or part of the game program read by the CD-ROM drive 20 from the CD-ROM 19. The image data area 13B stores image data such as the background or game characters required in the process of execution of the program. The work area 13C stores various types of data generated in the process of execution of the program.

Note that the game program and image data can be supplied from an HDD 14 other than a CD-ROM 19. In this case, the game program 15 or image data may be stored in a hard disk of the HDD 14. The hard disk may store the game program or image data installed in advance or downloaded through the communications line 110 from the network 111.

Further, the internal bus 25 has connected to it an input interface unit 24, a sound processor 18, and a graphics processor 16. The keypad 50 is connected through the input interface unit 24 to the internal bus 25. Further, the TV set 100 connects the sound processor 18 and graphics processor 16 through it to the internal bus 25.

The graphics processor 16 is provided with a video random access memory (VRAM) 17 having a frame buffer. The graphics processor 16 generates a video signal based on the image data stored in the frame buffer by instructions from the controller 12 along with execution of the program and outputs the video signal to the TV set 100. Due to this, an image is displayed on the display screen 101 of the TV set 100 by the image data stored in the frame buffer.

The sound processor 18 generates a sound signal expressing voices, background music (BGM), sound effects, etc. in accordance with the instructions from the controller 12 and outputs the sound signal to the TV set 100.

The internal bus 25 further has connected to it a CD-ROM drive 20 and a memory card reader-writer 23. The CD-ROM drive 20 reads the game programming, image data, sound data, etc. stored in the program product, that is, the CD-ROM 19. The memory card reader-writer 23 writes data to and reads data from the memory card 22 in accordance with the control of the controller 12. The data written in the memory card 22 includes data showing the intermediate progress of the game, data indicating the environment settings of the game, etc.

Figure 2:
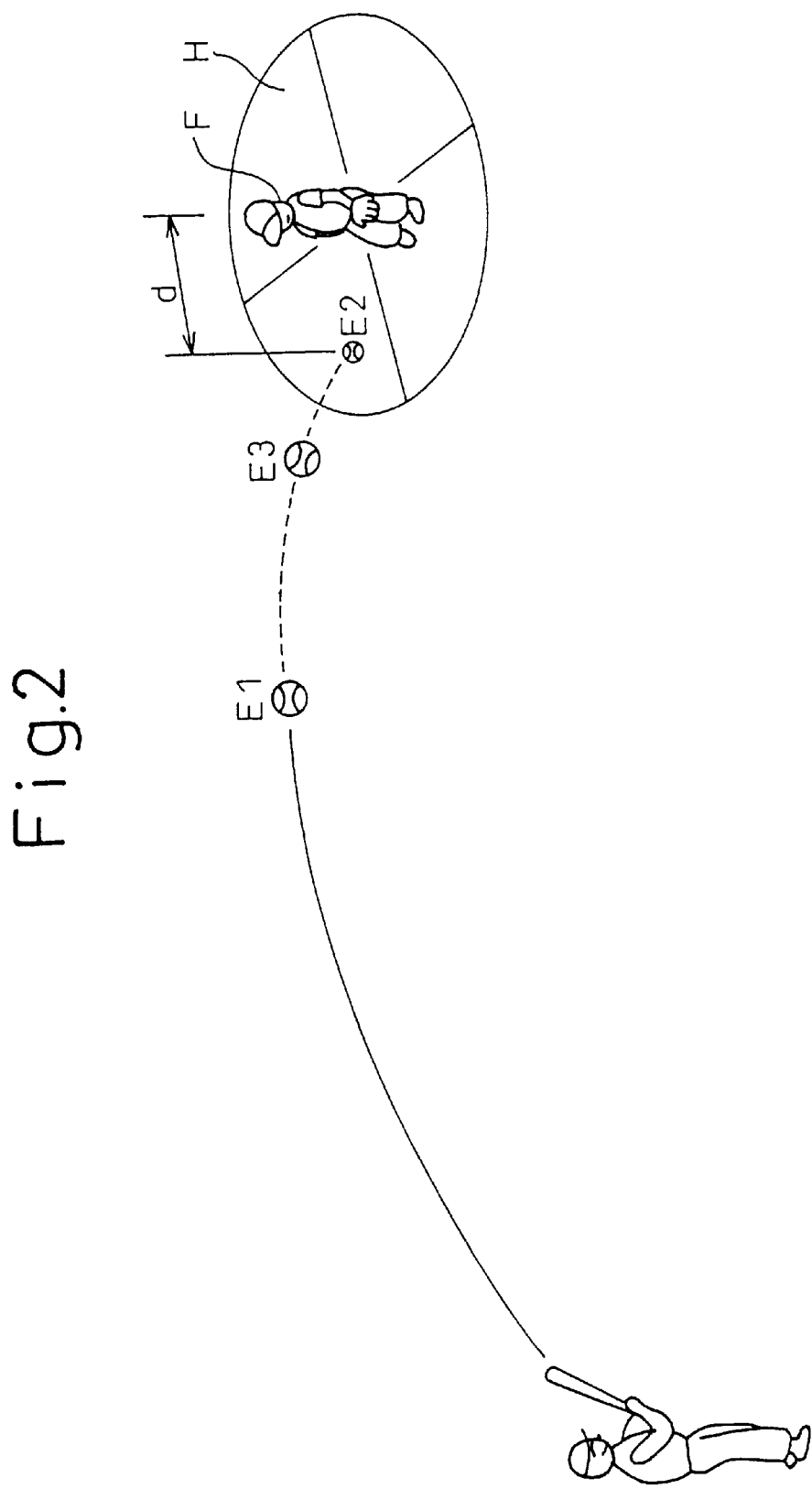
FIG. 2 is a view conceptually explaining a catching motion according to an embodiment of the present invention.

Next, an explanation will be given of an embodiment of the present invention using an example of a baseball game. FIG. 2 conceptually shows the method of judging the catching in the present embodiment. In FIG. 2, E1, E2, and E3 show positions of the ball, while F shows a fielder. H shows the movement range of the fielder, while d shows the distance between the ball and fielder F when the ball reaches the position E2.

As shown in FIG. 2, in a baseball game, when the batter hits the ball or performs another action, the ball moves in the virtual space and for example is displayed at the position E1. When the ball moves, the group of motions preset as the data belonging to a player, that is, members of the side in the field (hereinafter referred to as the fielders including the catcher), is referred to. The group of motions is the data defining the continuous actions of a player (motion data). The movable distance H of the fielder F in the catching motion is obtained based on the group of motions.

Further, the time required for the fielder F to move over the movable range H is obtained based on the group of motions. Further, the position of the ball after exactly the time required for movement over the movable range H from the time where the ball is displayed at the position E1 is predicted. That is, the future position of the ball is predicted.

For example, in the case of a group of motions where the time required for movement over the movable range H is 20 frames (for example, 1/60 second for 1 frame), the position E2 of the ball after, for example, 20 frames is predicted. Further, in the case of a group of motions where the time required for movement over the movable range is 10 frames, the position E3 of the ball after 10 frames is predicted. Further, whether the ball can be caught is judged by whether the predicted position of the ball is in the movable range H of the fielder F.

Whether the ball can be caught is judged by calculating the time required to reach the predicted position of the ball and determining if the group of motions enables action of the fielder for more than the calculated time. If the group of motions causes the fielder to act for a time more than the calculated required time, it is judged that the ball can be caught by that group of motions. Further, if the group of motions is one by which the fielder can be made to act for only a time less than the calculated required time, it is judged that the ball cannot be caught by that group of motions.

Whether the ball can be caught may also be judged by subtracting the time required for reaching the predicted position of the ball from the time of action up to the fielder catching the ball by the group of motions. That is, if the result of the subtraction is positive, the ball can be caught, while if the result of subtraction is less than 0, the ball cannot be caught.

Further, in the calculation of the time required for reaching the predicted position of the ball, the required time need not be accurately calculated. For example, it is sufficient to judge if the time required for reaching the predicted position of the ball is longer or shorter than the time of action of the fielder by the group of motions.

If the distance of movement per frame when the fielder moves by a group of motions is substantially constant, the comparison of the length of the time may be replaced by comparison of the position of the fielder and the predicted position of the ball.

For example, by comparing the radius of the movable range H with the distance between the fielder F and the predicted position of the ball, it is possible to judge if the ball can be caught. The radius of the movable distance H may be found by the amount of movement per frame when the fielder moves based on a group of movement and the number of frames of the group of motions.

For example, when it is predicted that the ball will move to the position E2 shown in FIG. 2, the distance d between the position of the fielder F and the predicted position E2 of the ball is calculated. If the distance d is less than the radius of the movable range H, it is judged that the ball can be caught. If the distance d is over the radius of the movable range H, it is judged that the ball cannot be caught.

In the example of FIG. 2, the position E2 of the ball is in the movable range H. That is, the group of motions corresponding to the movable range H can make the fielder act for exactly the time greater than the time required for reaching the predicted position E2 of the ball. Therefore, if it is predicted that the ball will move to the position E2, it is judged that the ball can be caught. When it is judged that the ball can be caught, the image of the catching action by the fielder F is displayed on the screen.

Here, consider the case where the position of the ball is outside the movable range H as shown by E3. In this case, the group of motions corresponding to the movable range H can only make the fielder act for a time less than the time required for reaching the predicted position E3 of the ball. Therefore, when it is predicted that the ball will move to the position E3, it is judged that the ball cannot be caught. If it is judged that the ball cannot be caught, the image of the catching action by the fielder F is not displayed.

Further, as the data given to the ball moving in the virtual space, for example, there is the data showing the height of the ball given with reference to the surface of the ball field (ball height data) in addition to the positional data on the plane of the ball with respect to the ball field (baseball field) (ball position data). When there is ball height data, it is possible to define the range of catchable height for the group of motions. When the range of catchable height is defined, it is possible to judge if the height of the ball is within the range of catchable height. In this case, for example, if the position E2 of the ball is within the movable range H of the fielder F and the height of the ball is within the range of catchable height, it is judged that the ball can be caught.

The group of motions is data belonging to a character. In the baseball game, multiple groups of motion are set for each fielder (for each field position). The groups of motions are set for each fielder in accordance with the direction of movement of the fielder, ball height, etc. Whether the ball can be caught is successively judged for each group of motion. If even one group enables the ball to be caught in the judgement of whether the ball can be caught, processing is performed so that an image of the catching action is displayed on the screen.

The correspondence between fielders and groups of motions in a baseball game is defined for each fielder. Note that data showing the correspondence between fielders and groups of motions is read from for example a CD-ROM 19 in accordance with the progress of the game and stored in the work area 13C of the RAM 13.

Figure 3:
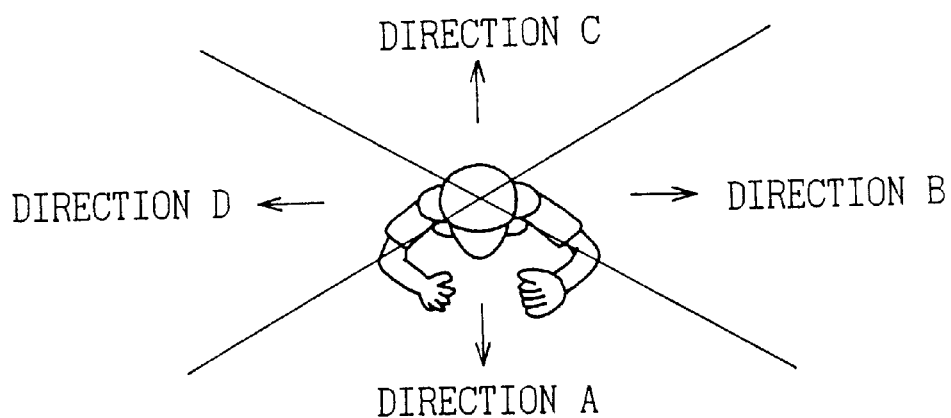
FIG. 3 is a view conceptually explaining the direction of movement of a player in an embodiment of the present invention.

Next, a detailed explanation will be given of the directions of movement for catching linked with a fielder. FIG. 3 is a schematic view of directions linked with a fielder. As shown in FIG. 3, in the present embodiment, four directions are defined for a fielder. The direction A is forward from the fielder. The direction B is toward the left from the fielder. The direction C is back from the fielder. The direction D is toward the right from the fielder.

The groups of motions are defined linked with the directions A, B, C, and D. Further, each group of motions has linked with it data such as a number of frames of the image display of the group of motions until catching, an amount of movement per frame, a catching range, a height of the glove at the time of catching, and a range of catchable height. Multiple groups of motions are set in advance for each direction A, B, C, and D with different catching ranges and ranges of catchable height. Further, the groups of motions are given numbers for identifying the data. The movable range of a fielder in the case of use of one group of motions may be found from the number of frames and the amount of movement per frame.

Figure 4:
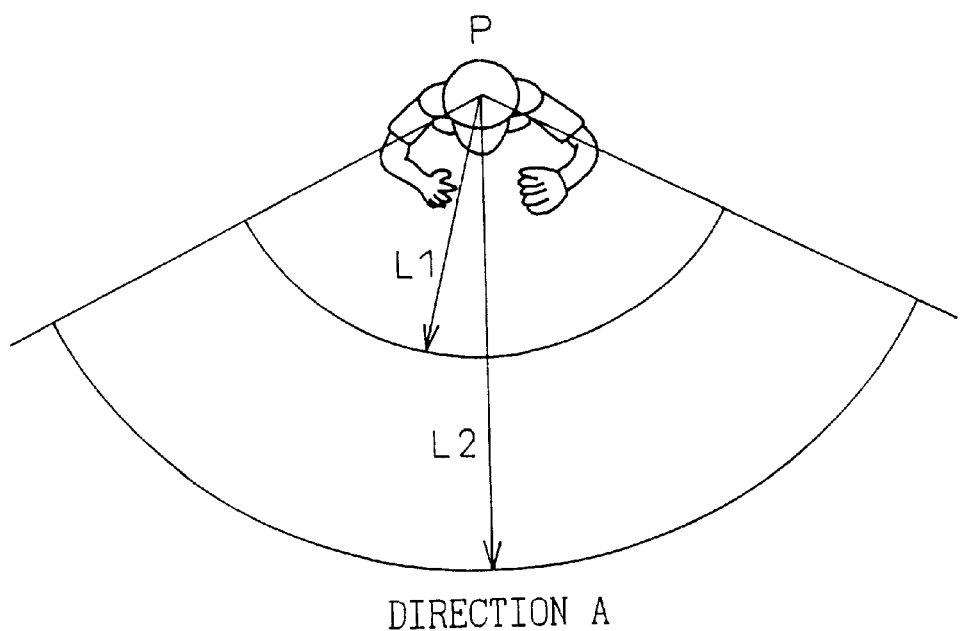
FIG. 4 is a view conceptually a catching range in an embodiment of the present invention.

FIG. 4 schematically shows the catching range in a group of motions. In FIG. 4, P shows the position of a fielder. L1 and L2 show distances from a position P of a fielder to predetermined positions. As shown in FIG. 4, the catching range in a group of motions is defined by the distances L1 and L2 from the position P of the fielder. The catching range is set in accordance with the difference in distance which must be moved by the fielder from its field position in order to catch the ball. That is, it is defined by the number of frames of image display by one group of motion and the amount of movement per frame.

For example, the number of frames for image display by one group of motions when it is necessary to catch the ball while running toward the hit ball is "20". In this case, the catching range becomes a range separated by the distance L1 and less than the distance L2. Further, when catching while waiting for a hit ball frontally, the number of frames for image display by one group of motions is "10". In this case, the catching range is a range of less than the distance L1. By setting the catching range for each group of motion, an image of a catching action of the fielder corresponding to the method of catching can be displayed. Therefore, an image with an on-the-spot feeling matching the actual situation can be displayed.

FIG. 5 and FIG. 6 show an example of the groups of motions linked with a fielder and data relating to groups of motions in the present embodiment. In the example of FIG. 5 and FIG. 6, tabular type data structures are shown. Note that the data set in FIG. 5 and FIG. 6 are for example read from the CD-ROM 19 and stored in the work area of the RAM 13.

FIG. 5 is an example of a data table recorded with data relating to catching in the present embodiment. In the example of FIG. 5, "direction", "group of motions", "number of frames", "amount of movement per frame", "catching range", "height of glove at catching", and "range of catchable height" columns are provided. Data positioned in the same row in the horizontal direction in the data set for each column are linked together.

The "DIRECTION" column is set with data indicating the direction of movement of a fielder moving in accordance with a predetermined rule. In the present embodiment, data is set showing four directions "A", "B", "C", and "D" (see FIG. 5). As shown in FIG. 3, the direction "A" is the forward direction from the fielder, the direction "B" is the left direction from the fielder, the direction "C" is the back direction from the fielder, and the direction "D" is the right direction from the fielder.

The "group of motion" column stores the groups of motions linked with the fielders (motion data defining motion). In the figure, the groups of motions are shown by numbers identifying the groups of motions. The groups of motions are set linked with the directions of movement of the fielder. Note that the groups of motions are stored in the work area 13C of the CD-ROM 19 or RAM 13.

Note that multiple groups of motions are linked with one direction of movement. In the present embodiment, the direction "A" has for example the groups of motions "#11", "#12", "#13", "#14", "#15" . . . linked with it (see FIG. 5). The direction "B" has for example the groups of motions "#21", "#22", "#23", "#24", . . . linked with it. The direction "C" has for example the groups of motions "#31", "#32", "#33", "#34", . . . linked with it (see FIG. 5). Further, the direction "D" has for example the groups of motions "#41", "#42", "#43", "#44", . . . "#M" (M is a natural number) linked with it (see FIG. 5).

The "number of frames" column is set with the number of frames up to catching in a group of motions linked with the groups of motions. Therefore, the number of frames of a group of motions is the number of display frames required from the start of the catching action to the end of the catching action when making a fielder act in that group of motion.

In the present embodiment, the number of frames corresponding to the groups of motions "#11", "#12", "#13", "#14", "#21", "#22", "#23", "#31", "#32", "#33", "#41", "#42", and "#43" is for example set to "20" (see FIG. 5). Further, the number of frames corresponding to the groups of motions "#15", "#24", "#34", "#44", . . . "#M" is set to for example "10" (see FIG. 5). Note that the number of frames of the groups of motions is set to a number of frames suitable for naturally displaying the catching action of the fielder by the group of motions.

The "amount of movement per frame" is set with the amount of movement per frame of each group of motions linked with the groups of motions. The amount of movement per frame is the distance of movement of the position of the fielder acting by a group of motions every time the displayed image of the frame is updated.

Note that the amount of movement is the maximum amount of movement per frame for each group of motions. It is possible to cause movement by a lesser amount of movement. Further, the distance of movement is set in units of meters (m) assuming a distance in the case where the baseball field defined in the virtual space is the same size as an actual baseball field (the same applies to the units of distance, amount of movement, and height as well in the following explanation). The values set in the "amount of movement per frame" column are for example positive real numbers.

In the present embodiment, the amount of movement per frame for the groups of motions "#11", "#12", "#13", "#14", and "#15" is for example set to "0.30 m". The amount of movement per frame for the groups of motions "#21", "#22", "#23", "#24", "#41", "#42", "#43", "#44", and "#M" is for example set to "0.20 m" (see FIG. 5). The amount of movement per frame for the groups of motions "#31", "#32", "#33", and "#34" is for example set to "0.15 m".

The "catching range" column is set with the catching range of a group of motions linked with the groups of motions. The catching range is expressed by a distance of the range naturally expressible by a group of motions given with reference to the position of the fielder. The values set are for example all positive real numbers.

In the present embodiment, the catching range for each of the groups of motions "#11", "#12", "#13", and "#14" is for example "L1 to L2" (range from distance L1 away from position of fielder to less than distance L2) (see FIG. 5). The catching range for the group of motions "#15" is for example "less than L1 " (range of less than distance L1 from position of fielder) (see FIG. 5).

The catching range for the groups of motions "#21", "#22", "#23", "#41", "#42", and "#43" is for example "L3 to L4" (range from distance L3 away from position of fielder to less than distance L4). The catching range for the groups of motions "#24", "#44", "#M" is for example "less than L3" (range of less than distance L3 from position of fielder).

The catching range for the groups of motions "#31", "#32", and "#33" is for example "L5 to L6" (range from distance L5 away from fielder to less than distance L6). The catching range for the group of motions "#34" is for example "less than L5" (range of less than distance L5 from fielder). Note that the values taken by L1, L2, L3, L4, L5, and L6 are positive real numbers.

The "height of glove at catching" column is set with the height of the glove at the time of catching in each group of motions linked with the groups of motions. The values set here are for example positive real numbers.

In the present embodiment, the height of the glove at the time of catching for the groups of motions "#11", "#15", "#21", "#24", "#31", "#34", "#41", and "#44" is for example "H1" (see FIG. 5). The height of the glove at the time of catching for the groups of motions "#12", "#22", "#32", and "#42" is for example "H2". The height of the glove at the time of catching for the groups of motions "#13", "#23", "#33", and "#43" is for example "H3" (see FIG. 5). The height of the glove at the time of catching for the groups of motions "#14" and "#M" is for example "H4" (see FIG. 5).

The "range of catchable height" column is set with the range of height where the fielder can catch the ball by each group of motions linked with the groups of motions. The range of catchable height is set according to the height of the glove at the time of catching. The values set here are for example positive real numbers.

In the present embodiment, for example, a group of motions with a height of the glove at the time of catching of "H1" is set with for example a range of a height of "0" to less than h1 (0 to h1) (see FIG. 5). A group of motions with a height of the glove at the time of catching of "H2" is set with for example a range of a height of "h1" to less than "h2" (h1 to h2) (see FIG. 5). A group of motions with a height of the glove at the time of catching of "H3" is set with for example a range of a height of "h2" to less than "h3" (h2 to h3) (see FIG. 5). A group of motions with a height of the glove at the time of catching of "H4" is set with for example a range of a height of "h3" to less than "h4" (h3 to h4) (see FIG. 5). Note that the values taken by h1, h2, h3, and h4 are positive real numbers.

In this way, the groups of motions at the directions A, B, C, D, . . . are set for each height of the glove at the time of catching (height of the baseball glove from the surface of the baseball field in the catching pose). For example, the values of H1 (0.05 m), H2 (0.58 m), H3 (1.10 m), and H4 (1.98 m) are set. The range of catchable height is determined in accordance with the height of the baseball glove at the time of catching.

For example, the values h1, h2, and h3 showing the boundary values of the "range of catchable height" are calculated by the following equations:

$$h1=(H1+H2)/2 \qquad 1$$

$$h2=(H2+H3)/2 \qquad 2$$

$$h3=(H3+H4)/2 \qquad 3$$

Further, the maximum value "h4" of the "range of catchable height" (maximum defined value) is assumed to be preset. In this case, the "range of catchable height" is determined as for example 0 to h1, h1 to h2, or h3 to h4.

FIG. 6 shows an example of a data table storing data relating to the throwing action in the present embodiment. In the present embodiment, the "direction" "group of motions", "throwing direction", and "throwable distance" columns are set (see FIG. 6). The "direction" column is set with the direction of movement of the fielder. The groups of motions are recorded there linked with the directions of movement "A", "B", "C", and "D" in the same way as the example of FIG. 5.

The "throwing direction" column is set with the throwing direction in each group of motions linked with the groups of motions . The set throwing direction is for example "forward", "right", "left", and "back".

A group of motions with a "forward" throwing direction is for example a group of motions where an infielder throws the ball to the catcher on home plate. A group of motions with a "right" throwing direction is for example a group of motions where the shortstop throws the ball to the third baseman covering third base. A group of motions with a "left" throwing direction is for example a group of motions where the second baseman throws the ball to the first baseman covering first base. A group of motions with a "back" throwing direction is for example a group of motions where the pitcher throws the ball to the second baseman covering second base or the shortstop.

Note that a "fielder covering a base" means a fielder moving toward the direction of a base. Which fielder covers which base is judged by processing in accordance with a predetermined rule (for example, the state of fielding). For example, the fielders closest to the bases (fielders able to reach bases fastest etc.) are judged to be the fielders covering the bases. This judgement is performed constantly after the batter hits the ball. Further, the judgement is performed constantly even when a fielder receives the ball.

The "throwable distance" column is set with the throwable distance of each group of motions linked with the groups of motions. In the example of FIG. 6, the throwable distances for the groups of motions "#11", "#12", "#13", "#14", "#21", "#22", "#23", "190 24", "#31", "#32", "#33", "#34", "#41", "#42", "#43", and "190 44" is for example "D1 to D2" (range D1 away and less than distance D2). The throwable distance for the groups of motions "#15" and "#M" is "0 to D1 " (range of less than distance D1).

A group of motions with a throwable distance of "D1 to D2" is for example a group of motions by which a ball is thrown overhand. Further, the group of motions with a catchable distance of "0 to D1" is for example a group of motions by which a ball is thrown underhand.

The baseball game is played out while referring to the data shown in the above FIG. 5 and FIG. 6. Below, an explanation will be given of the processing relating to a baseball game executed by the video game machine 10.

The following processing is executed by the video game machine 10 by the controller 12 executing the program of the baseball game. That is, when a ball is made to move in a baseball game, the number of frames is obtained from the data relating to the above group of motions. Further, the position of the ball when the screen display is advanced by exactly the obtained number of frames from the state where the position of the ball is displayed is predicted and obtained. Further, the movable distance by a group of motions according to data relating to the group of motions is calculated from the number of frames defined for data relating to the group of motions and the amount of movement per frame. Whether the ball can be caught or not, that is, whether the fielder can reach the predicted position of the ball or not, is successively judged for each group of motions based on the calculated distance.

If able to reach the future position of the ball by one certain group of motions, it is judged that the ball can be caught by that group of motions. When it is judged that the ball can be caught, the image of the catching action by the series of motions defined by that group of motions is displayed on the screen. Note that the position of the ball when the screen display is advanced by exactly a number of frames may be predicted by calculation by the direction of movement, speed, etc. of the ball.

Next, the operation of the video game machine 10 according to the above configuration will be explained with reference to the flow charts shown in FIG. 7, FIG. 8, FIG. 9, and FIG. 12 and the explanatory views shown in FIG. 10A, FIG. 10B, FIG. 11A, FIG. 11B, FIG. 13A and FIG. 13B. Note that the following processing is performed by the controller 12 of the game console 11 executing a program. In inning processing, the processing of the present embodiment is executed. Here, the inning processing is processing from the start to end of the batting round of one team. That is, in the following explanation, the part of an inning where the visiting team is at bat and the part of an inning where the home team is at bat are treated as different innings.

Figure 7:
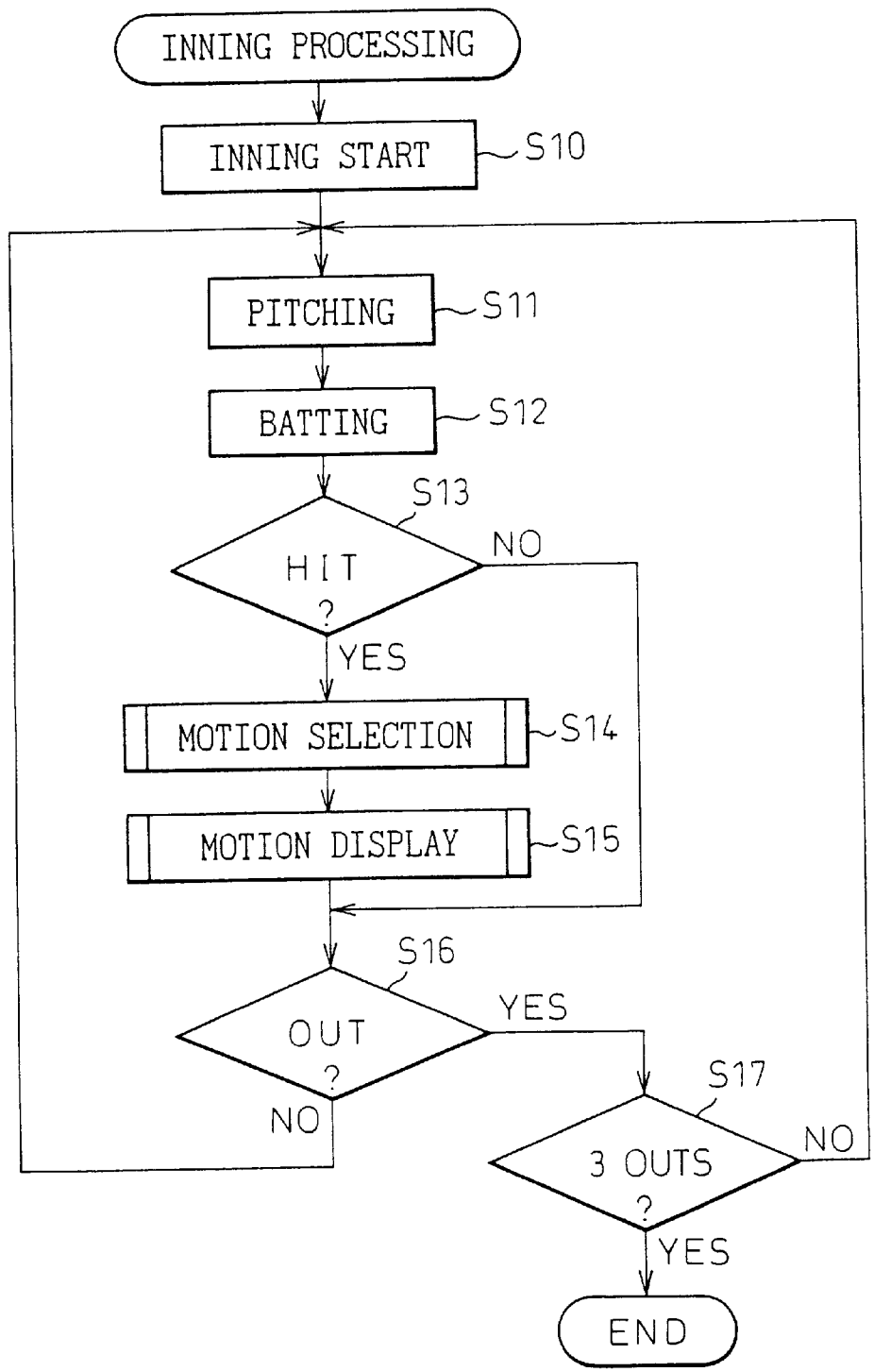
FIG. 7 is a flow chart for explaining a main action according to an embodiment of the present invention.

FIG. 7 if a flow chart of the inning processing of the baseball game according to the present embodiment. The following processing is executed by reading a program stored in for example a CD-ROM 19. The program is processed under the control of the CPU.

First, the inning start processing is performed (step S10). In the inning start processing, for example, the processing is performed for displaying the fielders of the team now in the field on the baseball field. Next, the pitching processing is performed (step S11). The pitching processing is processing for displaying the action of the pitcher pitching the ball toward the catcher. The position to which the pitcher pitches the ball at this time etc. are determined in response to operational input of the user or the results of processing by the controller 12 based on the program.

The batting processing is performed after the end of the pitching processing (step S12). The batting processing is processing for displaying the actions of the fielders and ball when the batter uses his bat to hit back the ball pitched by the pitcher. The position where the batter swings the bat etc. are determined in response to an operational input of the user (user at bat) or results of processing by the controller 12 by the computer (user in the field).

When the batting processing ends, it is judged if the ball has been hit (fair ball, foul, etc.) (step S13). "Hit" means the ball pitched by the pitcher being hit back by the bat held by the batter. When it is judged that the ball has not been hit (NO route of step S13), it is judged if the batter has been struck out (step S16). The batter being struck out without hitting the ball means for example when the batter has swung three times without connecting.

When it is judged that the batter has not been struck out (NO route at step S16), the processing proceeds to step S11. Further, when it is judged that the batter has been struck out (YES route of step S16), the processing proceeds to step S17.

At step S17, it is judged if three batters have been called out. Here, if three players are out, the batting round of the team at bat ends and the teams change. In the present embodiment, the inning processing ends when three batters are out (YES route of step S17). If three batters are not out (NO route of step S17), the processing returns to the pitching processing (step S11).

When it is judged that the ball has been hit (YES route at step S13), motion selection processing is performed (step S14). This motion selection processing is processing for selecting the optimal group of motions for making the fielder catching the ball naturally act in accordance with the state of progress of the game or the operational input of the user. Details of the motion selection processing will be given later.

After the end of the motion selection processing, motion display processing is performed (step S15). The motion display processing displays on the screen the fielder acting by the group of motions selected at step S14. Details of the motion display processing will be given later.

After the end of the motion display processing, it is judged if the player on the team at bat is out (step S16). When the batter or runner of the team at bat is out (YES route of step S16), the processing proceeds to step S17. Further, when neither the batter nor runner of the team at bat is not out (NO route of step S16), the processing proceeds to step S11.

When it is judged that a player on the team at bat is out (YES route of step S16), it is judged if there are three outs (end of batting round of team at bat) (step S17). If there are three outs (YES route of step S17), the inning processing is ended. If there are not three outs (NO route of step S17), the processing proceeds to the pitching processing (step S11).

Next, an explanation will be given of the details of the motion selection processing. Note that the following motion selection processing is processing when the user is controlling the team in the field as an example.

Figure 8:
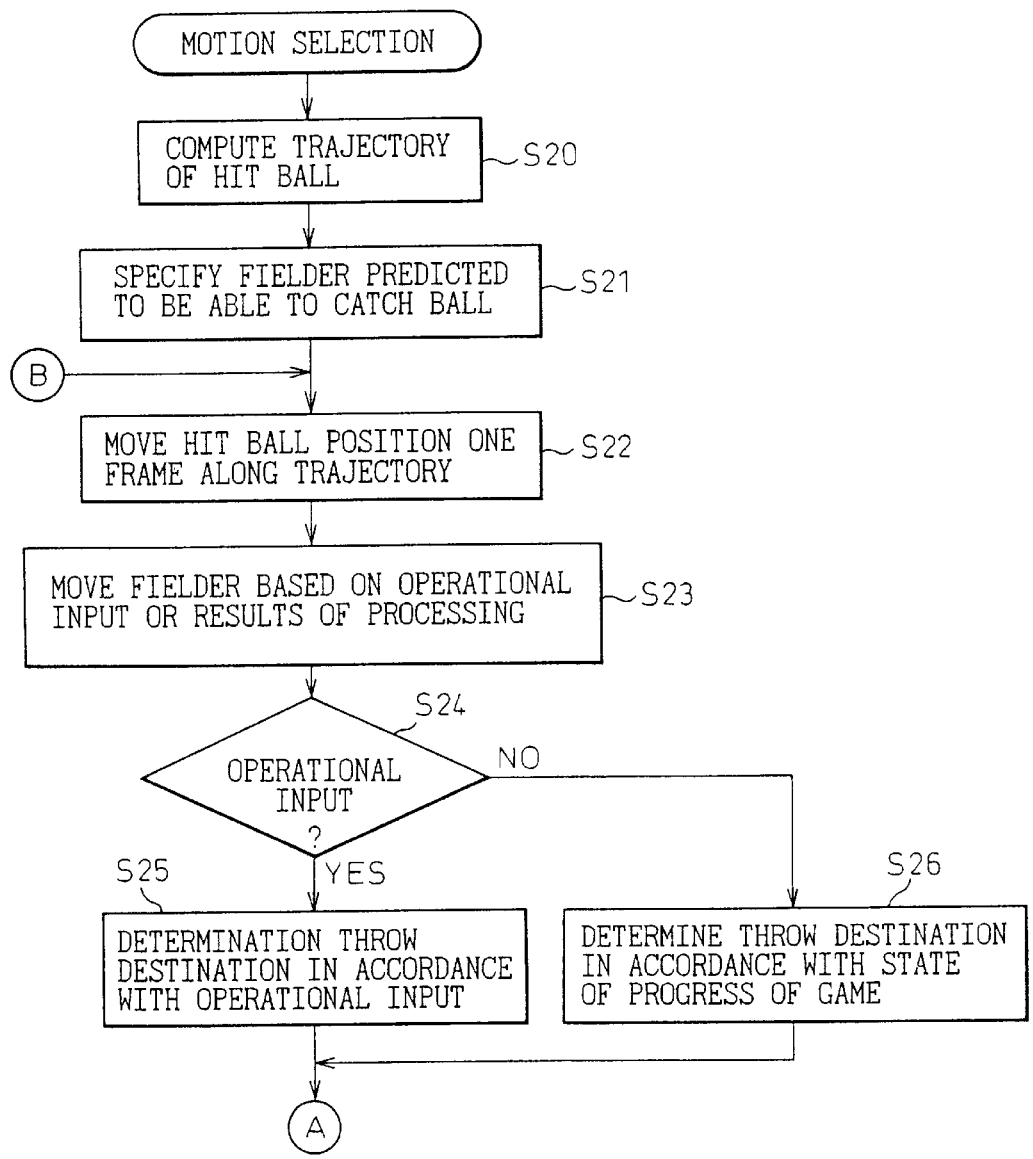
FIG. 8 is a flow chart for explaining motion selection of a player according to an embodiment of the present invention.
Figure 9:
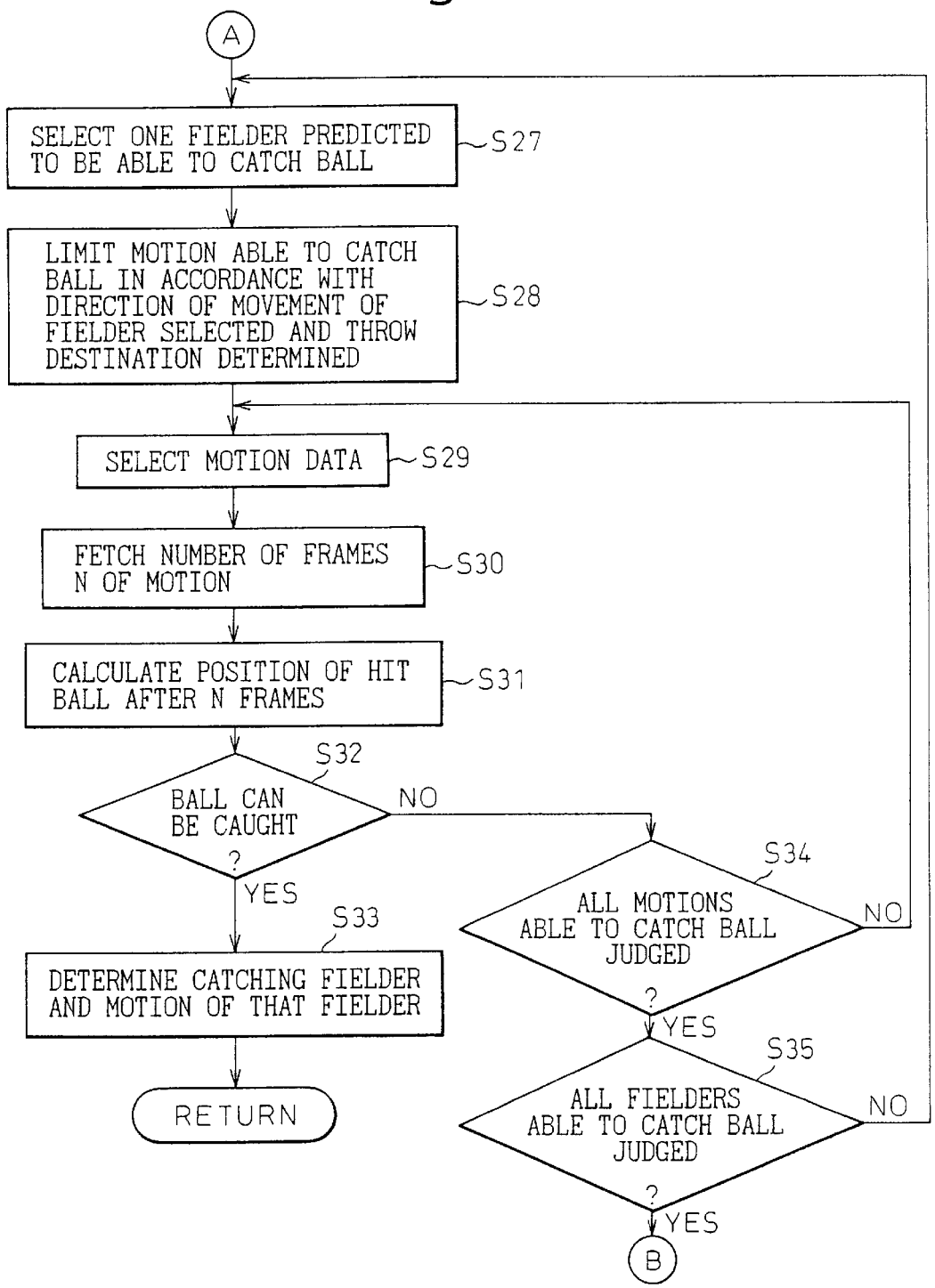
FIG. 9 is a flow chart for explaining motion selection of a player according to an embodiment of the present invention.
Figure 10A:
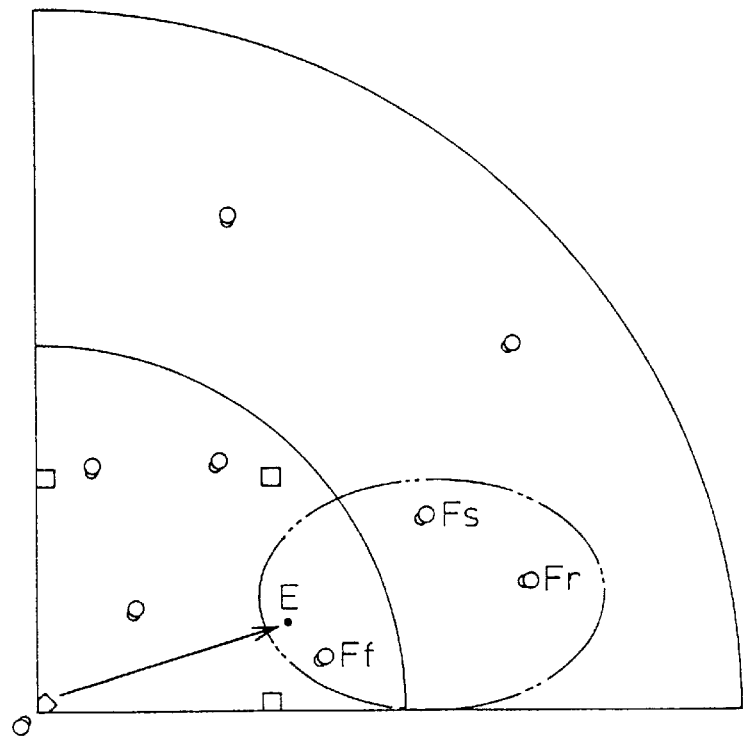
Figure 10B:
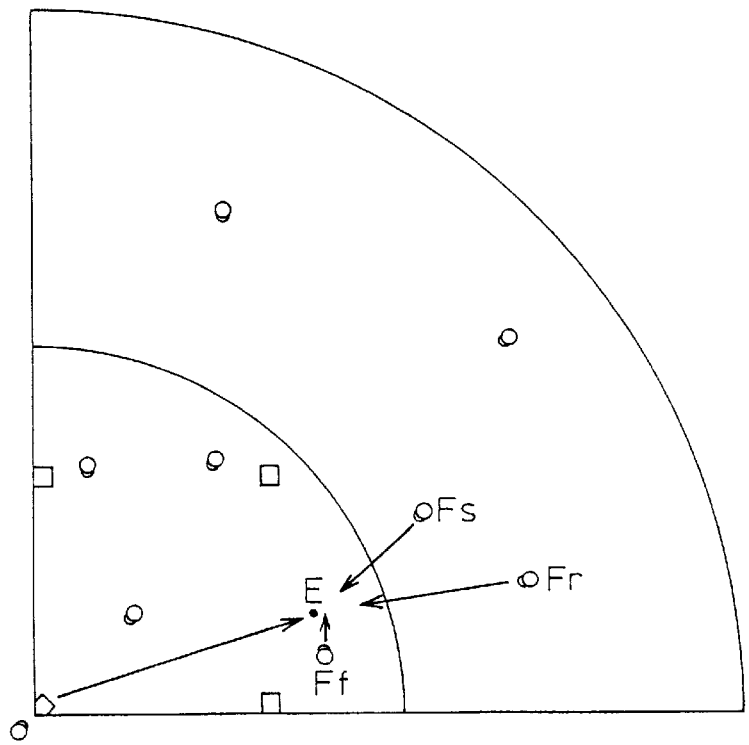
FIG. 10B is a view explaining a method of movement of a player with respect to a ball according to an embodiment of the present invention.

FIG. 8 and FIG. 9 show the routine of the motion selection processing according to an embodiment of the present invention. First, an explanation will be given of the motion selection processing referring to FIG. 8. In the motion selection processing, the trajectory of the hit ball is calculated (step S20). The trajectory of the hit ball is calculated based on the speed of the hit ball (or the strength of the hit ball) and its direction of flight.

The fielders predicted as able to catch the ball are specified by the direction of the hit ball (path of ball) (step S21). For example, when the ball flies to the position E of the direction shown by the arrow in FIG. 10A, the first baseman Ff, second baseman Fs, and right fielder Fr are predicted as fielders able to catch the ball.

Next, an image of the change of the position of the ball is displayed by an instruction advancing the position E of the ball (see FIG. 10A) one frame at a time along the trajectory of the ball (step S22). Next, processing is performed to make the fielders predicted as able to catch the ball (first baseman Ff, second baseman Fs, and right fielder Fr) approach the position E of the ball based on the operational input of the user on the keypad 50 or the results of processing (step S23).

Next, it is judged if there has been an operational input of the user designating the throw destination (step S24). In the present embodiment, it is possible to designate the throw destination by advance input before a fielder catches the ball. When the user inputs an operation (operating the keypad 50) to designate the throw destination after the ball is hit, the information of the button depressed is stored.

That is, at step S24, if information of a button designating the throw destination is stored, it is judged that there has been an operational input. If information of a button designating the throw destination is not stored, it is judged that there has been no operational input. Note that the button operation for the advance input may be performed by either one button, several buttons, or a combination of buttons and the joystick.

When there has been an operational input (YES route of step S24), the throw destination is determined in accordance with the operational input. In the present embodiment, a fielder covering one of the bases is determined as the throw destination by an operational input (step S25). After the determination of the throw destination, the processing proceeds to step S27 shown in FIG. 9.

When there has been no operational input (NO route of step S24), the optimal throw destination (fielder) for the state of progress of the game is determined (step S26). The optimal throw destination is determined for each frame. Further, the optimal throw destination is determined individually for all fielders predicted as able to catch the ball.

For example, consider the case where the hit ball rolls toward a point between the first baseman and second baseman in the state with no runners on base. In this case, the first baseman, second baseman, and right fielder are predicted as fielders able to catch the ball. Further, the optimal throw destination is determined for each of the first baseman, second baseman, and right fielder.

For example, it is judged that the batter can be tagged out if the first baseman catches the ball. For the first baseman, the fielder covering first base is determined as the optimal throw destination. Similarly, it is judged that the batter can be tagged out if the second baseman catches the ball. For the second baseman, the fielder covering first base is determined as the optimal throw destination. On the other hand, it is judged that the batter cannot be tagged out even if the right fielder catches the ball. For the right fielder, the fielder covering second base is determined as the optimal throw destination. After the optimal throw destination is determined for all fielders which could catch the ball, the processing proceeds to step S27 shown in FIG. 9.

An explanation will be made next of the processing from step S27 on referring to FIG. 9. After the throw destination is determined at steps S25 and S26 of FIG. 8, one of the unselected fielders among the fielders predicted as able to catch the ball (in the example of FIG. 10A, the first baseman Ff, second baseman Fs, and right fielder Fr) is selected (step S27).

The groups of motions enabling catching are limited by the direction of movement of the selected fielder, the direction of the fielder determined as the throw destination, etc. (step S28). The "direction" column of the data table shown in FIG. 5 is referred to and only the groups of motions linked with the direction of movement of the fielder become groups of motions enabling catching. For example, if moving to the right such as with the first baseman Ff, the groups are limited to groups of motions for catching at the right position (groups of motions of direction D).

Further, by referring to the "throwing direction" column of FIG. 6, only the groups of motions enabling the ball to be thrown to the determined throw destination are made the groups of motions able to catch the ball. For example, when the fielder covering first base is determined as the throw destination, only the groups of motions with a throw direction to the left become the groups of motions enabling catching among the groups of motions for the second baseman.

Further, when the determined throw destination is a throw destination determined at step S25 (throw destination determined in response to operational input), only the groups of motions from catching to throwing become the groups of motions enabling catching. If the determined throw destination is a throw destination determined at step S26 (throw destination determined without regard as to operational input), the groups are limited to the groups of motions from catching, through the pose for throwing the ball, to the waiting state (meaning neutral state).

Further, only the groups of motions suitable to the distance from the determined throw destination are made the groups of motions enabling catching by referring to the "throwable distance" column of FIG. 6. For example, when the shortstop throws the ball to the first baseman, the groups are limited to groups of motions for throwing the ball overhand. Further, when the first baseman throws to the pitcher covering first base, the groups are limited to groups of motions throwing the ball underhand (toss).

In this way, at step S28, the groups of motions enabling catching are limited to the groups of motions satisfying all of the condition relating to the direction of movement of the fielder, the condition relating to the throwing direction, the condition relating to the method of determination of the throw destination, and the condition relating to the throwable direction.

Next, one of the unselected groups of motions is selected among the groups of motions corresponding to the limited groups of motions (step S29). The "number of frames" column of the data table shown in FIG. 5 is referred to and the number of frames N of the group of motions (N is a natural number) is obtained from the selected group of motions (step S30). For example, if the selected group of motions is "41" (see FIG. 5), the number of frames N is "20".

Next, the "amount of movement per frame" of the data table shown in FIG. 5 is referred to and the position of the ball at the time when advancing the screen display by exactly the number of frames N is calculated from the direction of movement, speed, etc. of the ball (step S3 1). The image display processing is performed every frame, so the time when the screen display is advanced by exactly the number of frames N means the time when the time required for the fielder to move over the movable range (for example, first baseman Ff shown in FIG. 10A and FIG. 10B) elapses. Note that the movable range H is determined by the number of frames of the selected group of motions and the amount of movement per frame.

Next, it is judged if the fielder can catch the ball based on the selected group of motions (step S32). This is the judgement of catchability. It is judged that the ball can be caught only when the following conditions 1,2, and 3 are all met. The conditions will be explained with reference to FIG. 2.

Condition 1: The following equation 4 is satisfied:

(Distance between position of fielder and position of ball)≦(number of frames N of selected motion data)×(amount of movement per frame)=(Maximum amount of movement of fielder per motion)    4

In equation 4, the position of the ball is the ball position on the ball field. Further, the number of frames N of the selected motion data is the number of frames of display from the start of the catching action to the catching by the group of motions being judged.

The (distance between position of fielder and position of ball)≦(number of frames N of selected motion data) means that the fielder reaches the future position of the ball by the group of motions in time to catch it. In other words, the ball is in the catchable range of the fielder.

Condition 2: The (distance between position of fielder and position of ball) be more than the lower limit of the catchable range set by the group of motions selected. For example, when the group of motions "#11" shown in FIG. 5 is selected and the distance between the position of the fielder and the position of the ball is less than L1, the ball is too close to the fielder. In this case, there is a strange feeling with a group of motions by which the fielder catches the hit ball while running toward it. Therefore, another group of motions is selected so that the fielder waits for the hit ball and catches it.

Condition 3: The height of the ball is within the catchable height range determined by the selected group of motions. The positional data of the ball includes the positional data of the ball on the surface of the ball field and the height data of the ball from the surface of the ball field. If the height of the ball is within the range of catchable height, it is judged that the ball can be caught.

Figure 11A:
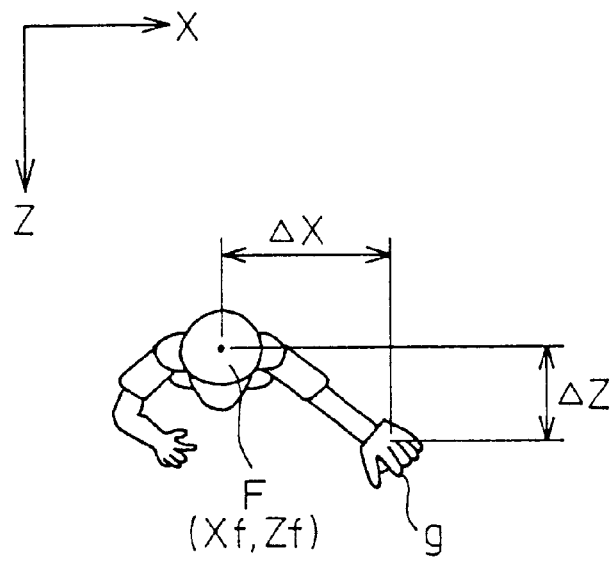
Figure 11B:
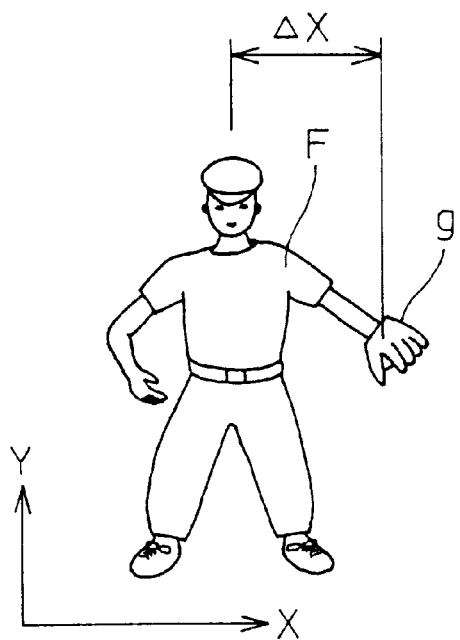
FIG. 11B is a view explaining a method of correction of motion when viewing a player from the front according to an embodiment of the present invention.

The distance between the position of the fielder and the position of the ball of the above condition 1 is calculated using the position of the fielder as the catching effector of the fielder, in this case, the position of the baseball glove. FIG. 11A and FIG. 11B are views for explaining the method of correction of the position of the fielder F and the position of the baseball glove g. FIG. 11A is a view when viewing the fielder from above. FIG. 11B is a view of the case when viewing the fielder from the front. In this example, the direction to the left of the fielder F is the X-axial direction, the direction to above the fielder F is the Y-axial direction, and the direction forward of the fielder F is the Z-axial direction.

The position of the baseball glove g is the actual catching position. As shown in FIG. 11A and FIG. 11B, the coordinate position of the fielder is made (Xf,Zf), while the positional difference of the baseball glove g with respect to the coordinate position of the fielder F is made ($\Delta X, \Delta Z$). In this case, (Xf+$\Delta X$, Zf+$\Delta Z$) becomes the coordinate position of the baseball glove. Further, it is possible to view the coordinate position of the baseball glove g as the position of the fielder F at the time of catching and judge whether the ball can be caught.

If it is judged that the ball can be caught by the above judgement of catchability (YES route of step S32), the selected fielder F is determined as the catching fielder. Further, the selected group of motions is determined as the group of motions from the catching fielder catching the ball to the waiting state or catching the ball to the throwing action (step S33). Next, the processing proceeds to step S15 of FIG. 7.

As opposed to this, if it is judged that the ball cannot be caught by the above judgement of catchability (NO route of step S32), it is judged if all of the motions enabling the ball to be caught limited at step S28 have been judged (judgement of catchability) (step S34). If there are groups of motions not yet judged (NO route of step S34), another group of motions limited by step S28 is selected and judged as to catchability (step S29 to step S32).

As opposed to this, if it is judged that all of the groups of motions enabling the ball to be caught have been judged (YES route of step S34), it is judged if all fielders predicted to be able to catch the ball, specified at step S21 (see FIG. 8), have been judged (judgement of catchability) (step S35). If there are fielders not yet judged (NO route of step S35), another fielder predicted to be able to catch the ball, specified at step S21, is selected and judged as to catchability (step S27 to step S34). If all of the fielders have been judged (YES route of step S35), the processing proceeds to step S22 shown in FIG. 8 and the processing for selection of the group of motions in the state with the game advanced by one frame is performed (step S22 to step S35).

Figure 12:
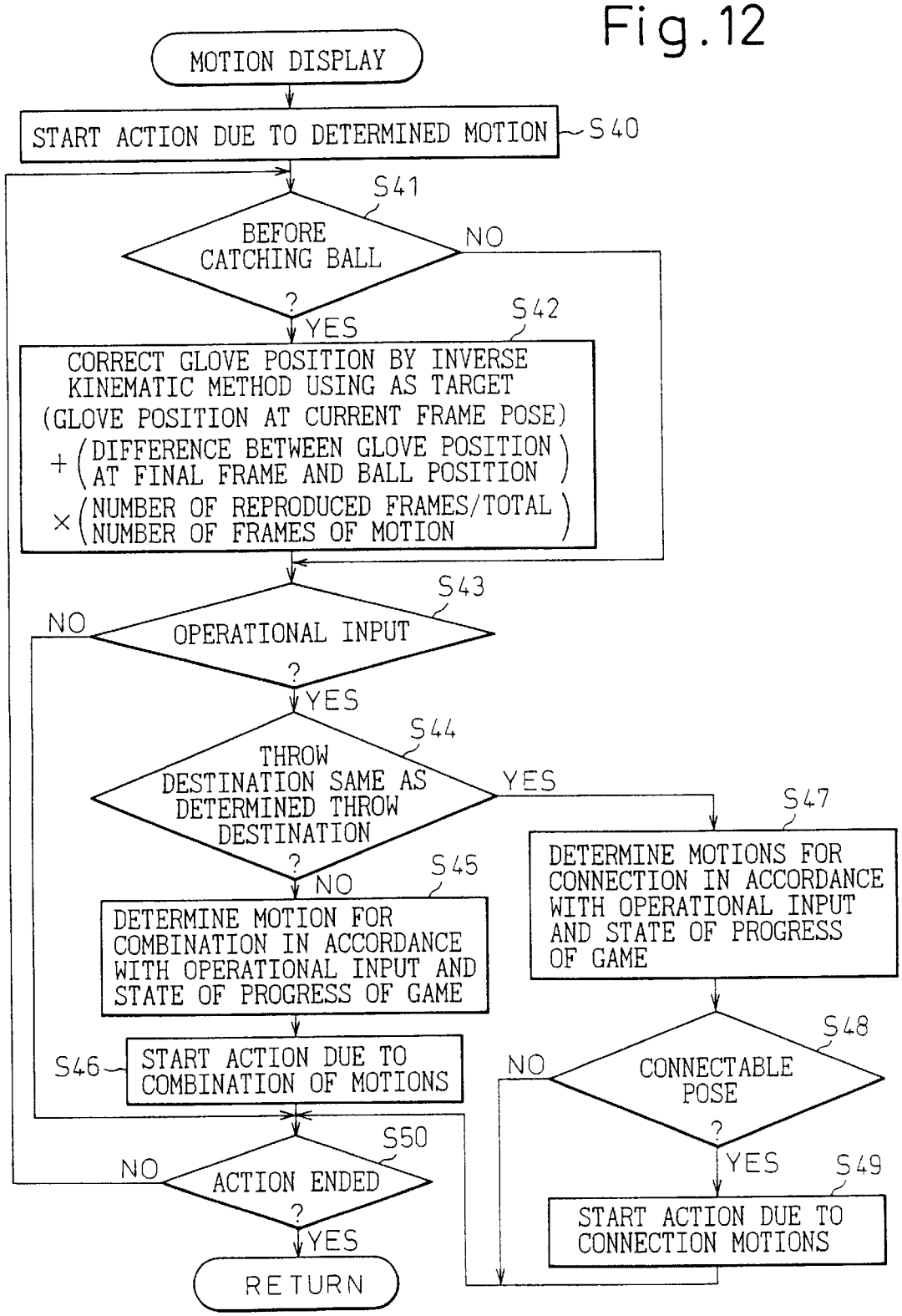
FIG. 12 is a flow chart for explaining motion display according to an embodiment of the present invention.

Next, a detailed explanation will be given of the processing for motion display. FIG. 12 shows the routine for the motion display processing. In the motion display processing, the action by the determined group of motions of the fielder determined at the motion selection processing is started (step S40). The fielder acting by the group of motions is displayed on the screen. The image display processing of the fielder is performed by the graphics processor 16 receiving instructions from the controller 12.

The image data for displaying the moving fielder on the screen using the group of motions is obtained from the image data area 13B of the RAM 13. The image data includes the model data for expressing the fielder F, model data of the catching effector held by the fielder, etc. Here, the "catching effector" means the displayed object to be moved to the position of the ball in the virtual three-dimensional space when the ball is being caught. In the present embodiment, the baseball glove g is the catching effector.

Further, the group of motions for displaying the motions is stored in the work area 13C of the RAM 13 from the CD-ROM 19. When making the fielder act, the group of motions is obtained from the work area 13C of the RAM 13.

The group of motions is the group of motions defining the motions from, for example, waiting for catching to throwing or from catching to the waiting state (neutral). This group of motions does not define a single motion (movement of fielder), but defines more than one continuous motions. That is, it defines a group of motions.

The group of motions from waiting to catch the ball to throwing includes the image data of the frames from the pose data of the start of the motions at the position waiting to catch the ball (starting frame) to the pose data at the end of the motions (final frame). In the pose data of the end of the motions, the baseball glove g is at the position of the completion of catching.

When a determined motion of the fielder is started, it is judged if the motion is before catching (step S41). Whether or not it is before catching is judged by whether the motion of the fielder has reached the pose at the time of catching. If before catching (YES route of step S41), the processing for correction of the glove position (step S42) is performed. If after catching (NO route of step S41), the processing for correction of the glove position is not performed and the routine proceeds to step S43.

In the processing for correction of the glove position, the glove position is corrected so that the baseball glove g finally is positioned at the intermediate position for catching (ball position) (step S42). The glove position is corrected every frame. Due to this, the baseball glove g is finally moved to the position of arrival of the ball by a natural action.

The glove position is corrected in accordance with the difference between the catching position (position of arrival of ball) and the glove position of the catching pose data.

The target position of the glove when correcting the glove position is found from the following equation:

Target position of glove=(glove position at pose of current frame)+(difference between glove position and ball position of final frame)×(number of played back frames/total number of frames of motion)                5

This position may be aimed at for correction by inverse kinematics. Details of the correction of the glove position will be given later.

When the glove position of one frame is corrected, it is judged if there is an operational input designating the throw destination (step S43). If there is no operational input by the user (NO route of step S43), it is judged if the action by the group of motions currently decided on has been completed (step S50). If the action has ended (YES route of step S50), the processing proceeds to step S16 of FIG. 7. If the action has not ended (NO route of step S50), the processing proceeds to step S41.

If there is an operational input by the user designating the throw destination (YES route of step S43), it is judged if the throw destination determined in response to the operational input is the same throw destination as the already determined throw destination (step S44).

If a throw destination different from the determined throw destination is designated (NO route at step S44), the group of motions for combination is determined in accordance with the operational input designating the throw destination and the state of progress of the game (step S45).

For example, it is judged to which fielder covering which base the ball should be thrown to in accordance with the operational input designating the throw destination. Further, the group of motions suited for making the ball be thrown to the fielder covering the target base is determined as the group of motions for combination. The determined group of motions for combination is a group of motions defining action from the current pose of the fielder or a pose similar to the current pose of the fielder to the throwing action.

When the group of motions for combination has been determined, action by the group of motions obtained by combining the current group of motions of the fielder and the group of motions for combination is started (step S46). The "combination of motions" is processing for combining the pose data for each frame of the two groups of motions so as to obtain intermediate pose data. The pose of the fielder displayed is determined from the pose data obtained by the combination. The pose of the displayed fielder is determined from the pose data obtained by the combination. After the start of the action by the combination of motions, it is judged if the action has ended (step S50).

On the other hand, if a throw destination the same as the determined throw destination is designated (YES route of step S44), the group of motions for connection is determined in accordance with the operational input designating the throw destination and the state of progress of the game (step S47). For example, the base is determined in accordance with an operational input designating the throw destination. Further, the state of progress of the game (which fielder covers the base determined) is judged. Further, a group of motions suitable for making the ball be thrown toward the fielder covering the base decided on is determined as the group of motions for connection. The group of motions for connection is a group of motions from the throwing pose (pose raising arm holding ball) to the throwing action.

When the group of motions for connection is determined, it is judged if the fielder is in a connectable pose (step S48). The "connectable pose" is the pose readying for throwing the ball. If not in a connectable pose (NO route of step S48), it is judged if the action has ended (step S50).

If a connectable pose (YES route of step S48), the action by the group of motions for connection is started (step S49). The group of motions for connection is started from a pose ready for throwing the ball, so the shift from the group of motions displayed previously to the group of motions for connection can be made natural. Next, it is judged if the action has ended (step S50).

Figures 13A, 13B:
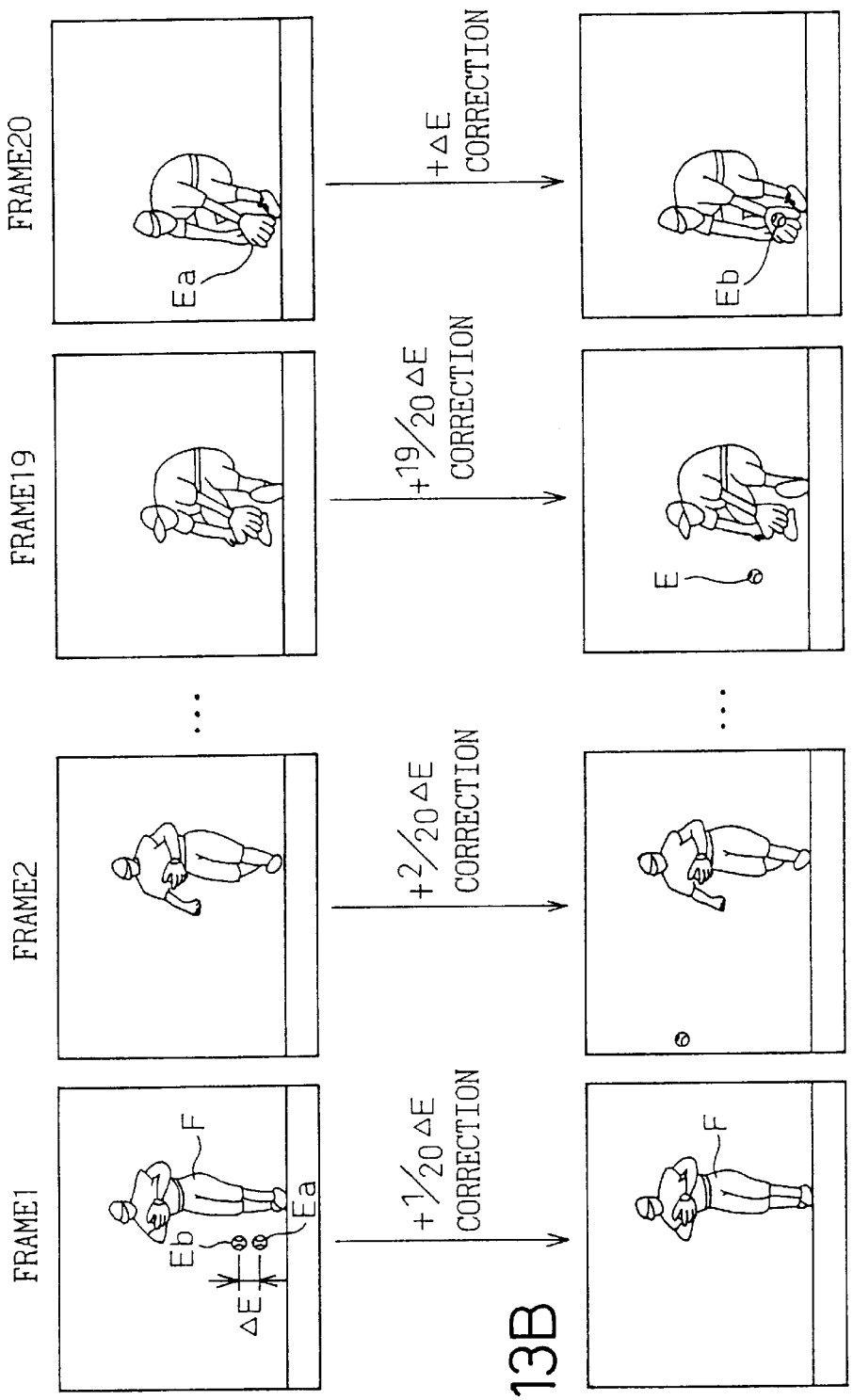

Next, a detailed explanation will be given of the correction of the above glove positions with reference to FIGS. 13A and 13B. FIG. 13A shows examples of frames before correction of the glove position, while FIG. 13B shows examples of frames after correction of the glove position.

Further, reference Ea shows the inherent position of the completion of catching of the group of motions, while reference Eb shows the catching position at the intermediate position to be corrected. There is a difference ΔE between the position of completion of catching Ea and the catching position Eb at the intermediate position.

In FIG. 13A and FIG. 13B, frame 1 is the starting frame, frame 2 is the next frame after the starting frame, frame 19 is one frame before the final frame, and frame 20 is the final frame. In frame 1, (1/20)ΔE is added to the glove position of frame 1 before correction of the glove position so as to correct the glove position. In frame 2, (2/20)ΔE is added to the glove position of frame 2 before correction of the glove position so as to correct the glove position. In frame 19, (19/20)ΔE is added to the glove position of frame 19 before correction of the glove position so as to correct the glove position. In frame 20, ΔE is added to the glove position of frame 2 before correction of the glove position so as to correct the glove position.

Figure 14:
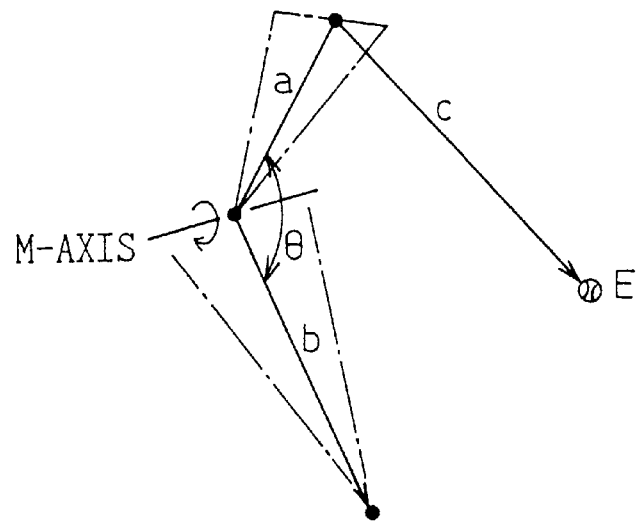
FIG. 14 is a view explaining inverse kinematics according to an embodiment of the present invention.

The movement of the arm along with the above correction can be obtained by inverse kinematics. In this case, as shown in FIG. 14, the upper arm of the arm with the baseball glove, that is, the catching effector, is made the vector a (vector from position of base of arm to position of elbow). The forearm is made the vector b (vector from position of elbow to position of wrist). Further, the vector from the position of the base of the arm to the catching position is made the vector c. Further, the elbow joint may be rotated only around the predetermined M-axis. Note that the M-axis is defined by the relative position and angle with respect to the vector a.

Next, an explanation will be given of an example of the method of calculation for correcting the arm of the fielder. Note that in equation 6, equation 7, equation 8, and equation 9, "." and "X" show the dot product and cross product, respectively, of the vectors. Further, in equation 6, equation 7, equation 8, and equation 9, to differentiate from the cross and dot products of the vectors, multiplication is shown by "*".

From the cosine rule, the cos θ may be found from the following equation:

$$\cos\theta = (|a|^2 + |b|^2 - |c|^2)/(2*|a|*|b|) \qquad 6$$

If the cos θ is obtained, the angle θ can be calculated by the inverse function of the cosine (arc cosine). Since it is defined that the elbow joint can rotate only around the local M-axis, the angle θ of the elbow joint found by this calculation may be made the angle of conversion around the M axis.

After the vector b is changed by the angle θ, the vector I from the base of the arm to the wrist is calculated by the following equation:

$$I = a + b \qquad 7$$

Further, the vector j vertical to the vector j and the vector c is found from the following equation:

$$j = I \cdot c / (|I \cdot c|) \qquad 8$$

Note that the vector j is a unit vector. The axis passing through the position of the base of the arm and parallel to the vector j is made the rotational axis for making the vector I and the vector c match.

Further, the cosψ when the angle of rotation is ψ is found from the following formula:

$$\cos\psi = I \cdot c / (|I|*|c|) \qquad 9$$

If cos ψ is obtained, it is possible to calculate the angle ψ from the reverse function of the cosine (arc cosine).

Further, by making the arm rotate by exactly the angle ψ using as a rotational axis an axis passing through the position of the base of the arm and parallel to the vector j, the movement of the arm is corrected. That is, the position of the baseball glove (following position of wrist) worn by the fielder is corrected. Note that this correction processing may also be found by a quaternion. By using a quaternion, it is possible to find the natural path of movement from the position before correction of the glove to the position after correction. Due to this, it is possible to find the intermediate state before the glove reaches the position after correction.

Figure 15:
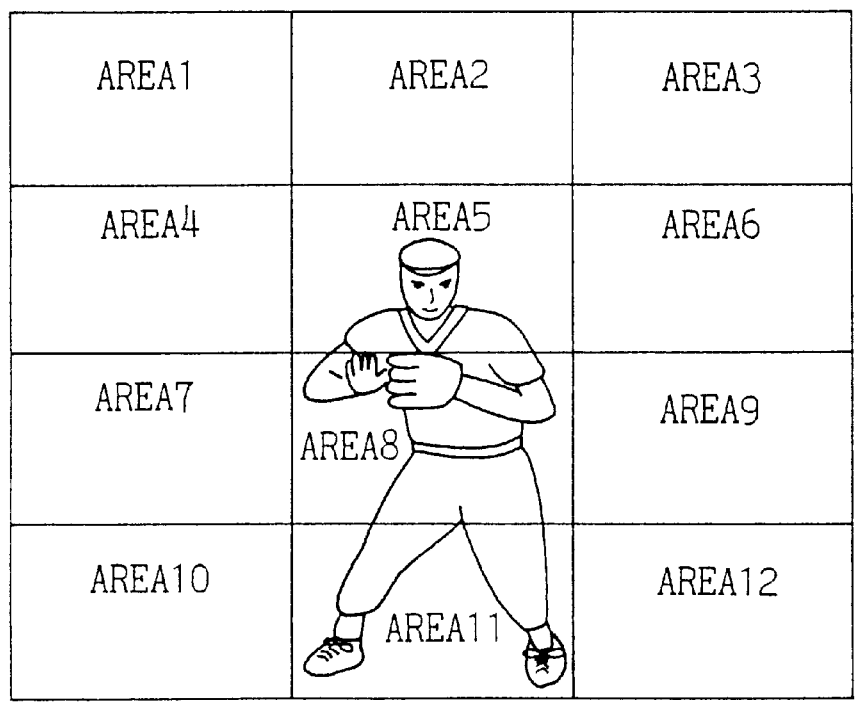
FIG. 15 is a view of assignment of groups of motions in a modification of an embodiment of the present invention.

In the above embodiment, the groups of motions were set three-dimensionally, i.e., for the forward, back, left, and right directions of the fielder for each height, but for simplicity, as shown in FIG. 15, it is also possible to view the fielder from the front, divide the area in a matrix in the left-right direction and height direction of the fielder, and set groups of motions in a 1-to-1 relationship with the areas 1, 2, 3, 4, 5, 6, 7, 8, 9, 10, 11, and 12.

In this way, the fielder catching the ball and the group of motions of the fielder are determined. The group of motions linked with the fielder is the group of motions defining the series of actions for throwing the ball to another fielder after catching it. The fielder for which the group of motions is determined is displayed on the screen by movement according to the definition of the group of motions.

Further, when the fielder catching the ball is determined, it is possible to find the other fielder to which the fielder should throw the ball by processing in accordance with predetermined rules. The predetermined rules are defined so that the throw destination thought optimal is determined based on the rules of baseball. For example, when the infielder catches a ball rolling on the field in the state with no runners on base, the rules are defined to throw to the first baseman.

By determining the throw destination by operational input of the user in advance in this way, it is possible to display the action of the fielder by a group of motions thought to be optimal from the catching to throwing. For example, when the shortstop catches the ball, if the throw destination is set to the first baseman, motion of throwing the ball to the first baseman overhand is displayed. Further, when the fielder catches the ball, if the throw destination is set to the second baseman, motion of throwing the ball to the second baseman underhand (toss) is displayed.

The optimal throw destination found by processing is canceled by the operational input of the user. That is, when the user designates another throw destination by operational input, the previously determined throw destination is canceled and the throw destination is determined in response to the operational input. That is, the throw destination is changed.

Such a change of the throw destination is possible even while the motions of the fielder from catching to throwing are displayed. If the throw destination is changed while the fielder is moving by the group of motions from catching to throwing, the motions shift from the motions of the fielder being displayed to the motions by the group of motions for throwing the ball to the changed throw destination.

Next, an explanation will be given of an example of the change in motions in the present embodiment. The following explanation assumes that the case where there are two outs and the shortstop catches the hit ball rolling on the ground while there are runners on first base and second base. In this case, in the processing for determination of the throw destination corresponding to the state of progress of the game of step S26 of FIG. 8, the fielder covering second base (second baseman) is determined as the throw destination.

First, an explanation will be given of the case where the same throw destination as the throw destination determined in accordance with the state of progress of the game is input after the start of action by a group of motions. FIG. 16A, FIG. 16B, FIG. 16C, FIG. 16D, FIG. 16E, FIG. 16F, and FIG. 16G show an example of the change of motion from the catching to throwing actions.

Before the fielder catching the ball is determined, as shown in FIG. 16A, the display screen 101 displays the fielder 61 just before the start of the catching action. The fielder 61 in the waiting state (shortstop) has the glove 62 on his hand and adopts a waiting pose for catching.

When the fielder 61 is determined as the fielder for catching, the catching action of the fielder is started by the simultaneously determined group of motions. When the catching action is started, as shown in FIG. 16B, the display screen 101 displays the fielder 61 moving toward the future position of arrival of the ball (in the example of FIG. 18B, the right direction).

When the position of the glove 62 reaches the position of arrival of the ball, as shown in FIG. 16C, the scene of the fielder 61 catching the ball 70 is displayed. At this time, the position of the glove 62 is corrected in accordance with the position of arrival of the ball. Therefore, in the catching scene, the position of the glove 62 and the position of the ball 70 accurately match.

After catching, as shown in FIG. 16D, the scene where the fielder 61 shifts to the throwing action is displayed. In this example, the scene of the fielder 61 raising the arm holding the ball 70 is displayed on the display screen 101.

Next, as shown in FIG. 16E, the fielder 61 in the throwing pose is displayed. If the same throw destination (second baseman) as the throw destination found by processing in advance is determined in accordance with an operational input before the throwing pose, the action by the group of motions for connection is started. As a result, as shown in FIG. 16F, the motion of the fielder 61 throwing the ball is displayed.

When the ball is thrown, as shown in FIG. 16G, the ball 70 is caught by the fielder 81 covering second base. In this example, the fielder 81 catches the ball 70 while running toward second base 71.

In this way, even at the stage where there is no operational input designating the throw destination, the fielder 61 is made to act by a group of motions suitable for throwing to the fielder covering second base. Further, if an operational input designating the fielder covering second base is detected after the fielder 61 catches the ball, the fielder 61 is made to perform the throwing action by the group of motions for connection after the fielder 61 adopts the throwing pose. Due to this, even if there is an operational input after the fielder 61 catches the ball, the connection of groups of motions enables the movement of the fielder 61 catching the ball 70 and throwing the ball to another fielder 81 to be displayed by natural motions.

Next, an example of the change in the motions from catching to the waiting state will be explained with reference to FIG. 17A, FIG. 17B, FIG. 17C, FIG. 17D, FIG. 17E, FIG. 17F, and FIG. 17G. This example is an example of the case where there is no operational input of the user designating a throw destination while the throwing pose is displayed on the display screen 101.

Note that if there is no operational input of the user while the throwing pose is displayed on the display screen 101, the action of the fielder 61 from the state waiting for catching to the throwing pose is displayed. Note that in this example, the change of the image from the state of waiting for catching to the throwing pose is shown. FIG. 17A, FIG. 17B, FIG. 17C, FIG. 17D, and FIG. 17E are the same as in the example shown in FIG. 16A, FIG. 16B, FIG. 16C, FIG. 16D, and FIG. 16E.

If there is no operational input of the user while the throwing pose is displayed on the display screen 101 (see FIG. 17E), as shown in FIG. 17F, the motion of the fielder 61 lowering the arm holding the ball 70 is displayed. Next, as shown in FIG. 17G, the fielder 61 enters a waiting state. In the waiting state, the ball 70 is held at the chest level. When the throw destination is determined, the state where the ball can be immediately thrown to the thrown destination is held.

Note that it is also possible to stop the movement of the fielder 61 and place him in the state waiting to throw the ball for a constant time from when the fielder 61 adopts a throwing pose. By having the fielder 61 adopt a throwing pose, if there is then an operational input of the user, the action of the fielder throwing the ball to the throw destination determined in response to the operational input can be naturally displayed.

If there is no operational input of the user while the fielder is adopting a throwing pose after the ball starts rolling on the ground, it is possible to make the fielder act by the group of motions defining the action for naturally changing from the state of the throwing pose to the waiting state.

Next, an example of the change of the motions accompanying a change of the throw destinations will be explained with reference to FIG. 18A, FIG. 18B, FIG. 18C, FIG. 18D, FIG. 18E, FIG. 18F, and FIG. 18G. In this example, assume that immediately after the fielder 61 catches the ball 70, the throw destination is changed to the fielder covering third base by an operational input of the user. In this case, the changes in the display image from the state of waiting for catching to the catching shown in FIG. 18A, FIG. 18B, and FIG. 18C are the same as the example shown in FIG. 16A, FIG. 16B, and FIG. 16C.

If the throw destination is changed to the fielder covering third base by an operational input of the user while reproducing the motion of the fielder from catching to throwing, as shown in FIG. 18D, motion making the fielder 61 turn around toward third base is displayed by a combination of motions. Next, as shown in FIG. 18E, the motion of the fielder 61 throwing the ball to the fielder covering third base is displayed on the display screen 101.

Next, the ball is thrown. As shown in FIG. 18F, the pose of the fielder 71 after throwing is displayed on the display screen 101. Next, as shown in FIG. 18G, the motion of the fielder 91 covering third base is displayed on the display screen 101. In this example, the fielder 91 catches the ball 70 in a pose running toward third base 72.

In this way, even if the throw destination is changed while the fielder is made to act by a group of motions, it is possible to display a fielder with natural motion by combination of motions.

As explained above, according to the present embodiment, the future ranges of movement of the players (fielders) and ball on the time axis are judged and the next processing is executed for each player.

That is, the position of the ball requiring a display time of a group of motions assigned to a player is calculated for each player in accordance with the judged future range of movement of the ball.

Further, the time required for a player to reach the calculated position of the ball is calculated in accordance with the future range of movement of the judged player for each player.

Further, a group of motions having a required time taking more time than the calculated required time is searched for from among the groups of motions assigned to the player for each player. The group of motion found is used to display movement of the player having that group of motions.

Due to this, in the catching action of the baseball game, the time required for reproducing realistic, smooth motion can be sufficiently secured. As a result, since realistic, smooth motion can be realized with a margin of time, it is possible to provide the user with play free from strangeness on the screen.

Further, according to the present embodiment, when no throw destination has been designated by an operational input of the user before the fielder catching the ball is determined, the optimal throw destination for the state of progress of the game is determined. Further, the fielder is moved by the group of motions suited for throwing the ball to the determined throw destination. Further, when a throw destination the same as the determined throw destination is designated by an operational input of the user after catching, the group of motions for connection is connected with the group of motions being reproduced, so motions up to throwing are reproduced. Due to this, even if the operational input of the user is later than the catching action, it is possible to smoothly reproduce the optimal series of motions for throwing the ball to the throw destination.

Further, according to the present embodiment, when a throw destination different from the throw destination determined in accordance with the state of progress of the game is designated by the operational input of the user, the already determined group of motions and the group of motions corresponding to the designated throw destination are combined. Further, the motions of the fielder throwing the ball to the designated throw destination are reproduced by the combined group of motions. Due to this, even if another throw destination has been designated during reproduction of motions suitable for throwing the ball to a certain throw destination, it is possible to reproduce smooth motion of the fielder by the combination of motions.

Further, according to the present embodiment, groups of motions with different required times until catching are assigned to a fielder (player). Further, it is judged if the fielder can reach the future position of the ball for each group of motions. Further, the catching motion of the fielder is reproduced by the optimal group of motions for the catching action in the required time in accordance with the required time until the future position of the ball. Due to this, it is possible to reproduce the motions from catching to throwing or the waiting state by a smooth action corresponding to the required time up to catching.

Further, according to the present invention, it is judged if a fielder can reach the future position of the ball based on the groups of motions assigned to the fielders (players) and the future position of the ball. Further, the motions by the judged fielder are reproduced. Due to this, it is possible to have the ball smoothly caught by a fielder able to track the future position of the ball by a natural action among the fielders.

In the above embodiment, the example was given of a baseball game as a ball-playing type game, but the present invention is not limited to this. It may be applied to any ball-playing game where a player catches a ball and sends the ball in any direction in accordance with the operation of the user such as soccer, basketball, American football, tennis, and ice hockey.

Further, the present invention can be applied to any of a specialized game machine, arcade machine, personal computer, portable information terminal, mobile phone, etc.

In the above embodiments, the program for realizing the embodiment of the present invention was stored in a CD-ROM or hard disk, but the present invention is not limited to this. It is also possible to store it on a magneto-optical disk (MO), DVD, or other computer readable program product. Further, when downloading the above program on to a hard disk, it is possible to use a commercial network, the Internet, Intranet, Extranet, etc. for the network 111 (see FIG. 1).

Summarizing the effects of the invention, according to the present invention, it is possible to obtain a computer readable program product storing a program of a ball-playing type game which enables the time required for reproducing realistic, smooth motion between a player and ball to be sufficiently obtained and therefore enables the user to be provided with a smooth play on the game screen, such a program, and a ball-playing type game processor and method.

While the invention has been described by reference to specific embodiments chosen for purposes of illustration, it should be apparent that numerous modifications could be made thereto by those skilled in the art without departing from the basic concept and scope of the invention.

What is claimed is:

1. A computer readable program product storing a program for a ball-playing type game which realizes a ball-playing game indirectly controlling movement of a ball in accordance with movement of a player, said program product storing a program for making a computer:
   judge a future range of player movement and a future range of ball movement;
   calculate a position of the ball after the elapse of a display time of each group of motions assigned to the player in accordance with the judged future range of ball movement, each player being assigned a plurality of groups of motions relating to manipulating the ball, each group of motions being assigned a required display time;
   calculate a time required to reach the calculated ball position in accordance with the judged future range of player movement;
   select a group of motions having a required time that is greater than the calculated required time from among the groups of motions assigned to the player; and
   display movement of the player employing the selected group of motions.

2. The program product of claim 1, in which the player further comprises a plurality of players,
   in which the judging further comprises making the computer judge a future range of movement for each of the plurality of players,
   in which the calculating further comprises making the computer calculate a time for each of the plurality of players, and
   in which the selecting further comprises making the computer select a group of motions for each of the plurality of players.

3. The program product of claim 1, in which the selecting further comprises selecting in response to the game progress state.

4. The program product of claim 2, in which the selecting further comprises selecting in response to the game progress state.

5. The program product of claim 1, further comprising, after calculating, making the computer judge a throw destination of the ball in response to a user operation, and in which the selected group of motions further comprises a group of motions for throwing the ball to the judged throw destination.

6. The program product of claim 5, in which the player further comprises a plurality of players,
   in which the judging further comprises making the computer judge a future range of movement for each of the plurality of players,
   in which the calculating further comprises making the computer calculate a time for each of the plurality of players, and
   in which the selecting further comprises making the computer select a group of motions for each of the plurality of players.

7. The program product of claim 6, in which the selecting further comprises selecting in response to the game progress state.

8. The program product of claim 5, wherein said program further makes said computer:
   judge the throw destination of the ball in response to a user operation when displaying the movement of the player,
   select the group of motions for throwing the ball to the judged throw destination from among the groups of motions assigned to the player in response to the state of progress of the game, and
   display the movement of the player using the selected group of motions and the group of motions already being used.

9. The program product of claim 5, in which the selecting further comprises selecting in response to the game progress state.

10. The program product of claim 5, wherein said program further makes said computer:
    judge the throw destination of the ball in response to a user when displaying the movement of the player,
    select the group of motions for throwing the ball to the judged throw destination from among the groups of motions assigned to the player in response to the state of progress of the game, and
    display the movement of the player using the selected group of motions and the group of motions already being used.

11. The program product of claim 10, wherein said program further makes said computer combine motions using said selected group of motions and the group of motions already being used.

12. The program product of claim 10, wherein said program further makes said computer connect motions using said selected group of motions and the group of motions already being used.

13. A ball-playing type game processor comprising:
    a computer readable program product storing a program for a ball-playing type game which realizes a ball-playing game indirectly controlling movement of a ball in accordance with movement of a player,
    a computer for reading and executing at least part of the program from said program product, and
    a display for displaying the ball-playing game realized by said program,
    said computer reading at least part of the program from said program product and thereby
    judge a future range of player movement and a future range of ball movement;
    calculate a position of the ball after the elapse of a display time of each group of motions assigned to the player in accordance with the judged future range of ball movement, each player being assigned a plurality of groups of motions relating to manipulating the ball, each group of motions being assigned a required display time;

calculate a time required to reach the calculated ball position in accordance with the judged future range of player movement;

select a group of motions having a required time that is greater than the calculated required time from among the groups of motions assigned to the player; and display movement of the player employing the selected group of motions.

14. The ball-playing type game processor of claim 13, in which the player further comprises a plurality of players, in which the judging further comprises making the computer judge a future range of movement for each of the plurality of players, in which the calculating further comprises making the computer calculate a time for each of the plurality of players, and in which the selecting further comprises the computer selecting a group of motions for each of the plurality of players.

15. The ball-playing type game processor of claim 13, in which the selecting further comprises selecting in response to the game progress state.

16. The ball-playing type game processor of claim 14, in which the selecting further comprises selecting in response to the game progress state.

17. The ball-playing type game processor of claim 13, further comprising, after calculating, the computer judging a throw destination of the ball in response to a user operation, and in which the selected group of motions further comprises a group of motions for throwing the ball to the judged throw destination.

18. The ball-playing type game processor of claim 17, in which the player further comprises a plurality of players, in which the judging further comprises the computer judging a future range of movement for each of the plurality of players, in which the calculating further comprises the computer calculating a time for each of the plurality of players, and in which the selecting further comprises the computer selecting a group of motions for each of the plurality of players.

19. The ball-playing type game processor of claim 18, in which the selecting further comprises selecting in response to the game progress state.

20. The ball-playing type game processor of claim 18, wherein said computer:

judges the throw destination of the ball in response to a user operation when displaying the movement of the player, selects the group of motions for throwing the ball to the judged throw destination from among the groups of motions assigned to the player in response to the state of progress of the game, and displays the movement of the player using the selected group of motions and the group of motions already being used.

21. The ball-playing type game processor of claim 20, wherein said computer connects motions using said selected group of motions and the group of motions already being used.

22. The ball-playing type game processor of claim 17, in which the selecting, further comprises selecting in response to the game progress state.

23. The ball-playing type game processor of claim 17, wherein said computer:

judges the throw destination of the ball in response to a user when displaying the movement of the player, selects the group of motions for throwing the ball to the judged throw destination from among the groups of motions assigned to the player in response to the state of progress of the game, and displays the movement of the player using the selected group of motions and the group of motions already being used.

24. The ball-playing type game processor of claim 23, wherein said computer combines motions using said selected group of motions and the group of motions already being used.

25. A ball-playing type game processing method for realizing a ball-playing game indirectly controlling movement of a ball in accordance with movement of a player using a computer, the method comprising:

judging a future range of player movement and a future range of ball movement;

calculating a position of the ball after the elapse of a display time of each group of motions assigned to the player in accordance with the judged future range of ball movement, each player being assigned a plurality of groups of motions relating to manipulating the ball, each group of motions being assigned a required display time;

calculating a time required to reach the calculated ball position in accordance with the judged future range of player movement;

selecting a group of motions having a required time that is greater than the calculated required time from among the groups of motions assigned to the player; and displaying movement of the player employing the selected group of motions.

26. The ball-playing type game method of claim 25, in which the player further comprises a plurality of players, in which the judging further comprises judging a future range of movement for each of the plurality of players, in which the calculating further comprises calculating a time for each of the plurality of players, and in which the selecting further comprises selecting a group of motions for each of the plurality of players.

27. The ball-playing type game method of claim 26, in which the selecting further comprises selecting in response to the game progress state.

28. The ball-playing type game method of claim 25, in which the selecting further comprises selecting in response to the game progress state.

29. The ball-playing type game method of claim 25, further comprising, after calculating, judging a throw destination of the ball in response to a user operation, and in which the selected group of motions further comprises a group of motions for throwing the ball to the judged throw destination.

30. The ball-playing type game method of claim 29, in which the player further comprises a plurality of players, in which the judging further comprises judging a future range of movement for each of the plurality of players, in which the calculating further comprises calculating a time for each of the plurality of players, and in which the selecting further selecting a group of motions for each of the plurality of players.

31. The ball-playing type game method of claim 30, in which the selecting further comprises selecting in response to the game progress state.

32. The ball-playing type game method of claim 29, in which the selecting further comprises selecting in response to the game progress state.

33. The ball-playing type game method of claim 30, further comprising:

judging the throw destination of the ball in response to a user when displaying the movement of the player, selecting the group of motions for throwing the ball to the judged throw destination from among the groups of motions assigned to the player in response to the state of progress of the game, and displaying the movement of the player using the selected group of motions and the group of motions already being used.

34. The ball-playing type game method of claim 33, further comprising combining motions using said selected group of motions and the group of motions already being used.

35. The ball-playing type game method of claim 33, further comprising connecting motions using said selected group of motions and the group of motions already being used.

36. The ball-playing type game method of claim 30, further comprising:

judging the throw destination of the ball in response to a user operation when displaying the movement of the player, selecting the group of motions for throwing the ball to the judged throw destination from among the groups of motions assigned to the player in response to the state of progress of the game, and displaying the movement of the player using the selected group of motions and the group of motions already being used.

* * * * *

UNITED STATES PATENT AND TRADEMARK OFFICE
CERTIFICATE OF CORRECTION

PATENT NO.      : 6,503,144 B1
DATED           : January 7, 2003
INVENTOR(S)     : S. Rimoto et al.

It is certified that error appears in the above-identified patent and that said Letters Patent is hereby corrected as shown below:

<u>Title page,</u>
Item [30], Foreign Application Priority Data, "020992" should be -- 020922 --.

<u>Column 28,</u>
Line 2, after "selecting" delete ",".

Signed and Sealed this

Seventh Day of October, 2003

JAMES E. ROGAN
*Director of the United States Patent and Trademark Office*